United States Patent
Torchalski et al.

(10) Patent No.: US 10,114,993 B2
(45) Date of Patent: Oct. 30, 2018

(54) RFID SYSTEM AND ASSOCIATED ANTENNA-COUPLER

(71) Applicant: ZIH Corp., Lincolnshire, IL (US)

(72) Inventors: Karl Torchalski, Arlington Heights, IL (US); Mao Tian, Vernon Hills, IL (US); Robert Gawelczyk, Chicago, IL (US); Steven Kovanko, Downers Grove, IL (US); Boris Y. Tsirline, Glenview, IL (US); Anthony Brown, Spring Grove, IL (US); Tom Zwier, Lake Zurich, IL (US)

(73) Assignee: ZIH Corp., Lincolnshire, IL (US)

( * ) Notice: Subject to any disclaimer, the term of this patent is extended or adjusted under 35 U.S.C. 154(b) by 211 days.

(21) Appl. No.: 14/642,592

(22) Filed: Mar. 9, 2015

(65) Prior Publication Data
US 2015/0242667 A1 Aug. 27, 2015

Related U.S. Application Data

(63) Continuation of application No. 11/850,489, filed on Sep. 5, 2007, now abandoned.
(Continued)

(51) Int. Cl.
*G06K 7/10* (2006.01)
*B41J 3/44* (2006.01)
(Continued)

(52) U.S. Cl.
CPC ............ *G06K 7/10376* (2013.01); *B41J 3/44* (2013.01); *B41J 29/38* (2013.01);
(Continued)

(58) Field of Classification Search
CPC ............ H04N 1/00342; H04N 1/00188; Y10T 156/1052; H01Q 1/2225; H01Q 1/22; H01Q 1/38; H01Q 1/2208; H01Q 1/2216
See application file for complete search history.

(56) References Cited

U.S. PATENT DOCUMENTS 2,812,501 A   11/1957   Sommers
4,486,758 A   12/1984   De Ronde
(Continued)

FOREIGN PATENT DOCUMENTS

EP   0590928    4/1994
FR   2822594    9/2002
(Continued)

OTHER PUBLICATIONS

Office Action for EP Application No. 07 842 974.3 dated Sep. 24, 2010. (copy available in U.S. Appl. No. 11/850,489 to which priority is claimed).
(Continued)

*Primary Examiner* — James Yang

(57) ABSTRACT

A RFID system and an associated antenna-coupler are provided. The system may be for selectively communicating with a targeted transponder from among a group of multiple adjacent transponders is provided. The system may include a transponder conveyance, a transceiver, and an antenna-coupler. The transponder conveyance is adapted to transport at least one targeted transponder from a group of multiple adjacent transponders through a transponder operating region. The transceiver is configured to generate one or more electrical signals. The antenna-coupler has first and second microstrips in a cross-like arrangement relative to each other. Each of the first and second microstrips is configured to transmit one or more electro-magnetic fields concentrated in a near-field region of the antenna-coupler based on the one or more electrical signals for communicating with the targeted transponder.

9 Claims, 18 Drawing Sheets

Related U.S. Application Data

(60) Provisional application No. 60/826,489, filed on Sep. 21, 2006.

(51) Int. Cl.

| | | |
|---|---|---|
| *B41J 29/38* | (2006.01) | |
| *G06K 17/00* | (2006.01) | |
| *H01Q 1/22* | (2006.01) | |
| *H01Q 9/04* | (2006.01) | |
| *H01Q 21/29* | (2006.01) | |

(52) U.S. Cl.
CPC ..... *G06K 17/0003* (2013.01); *G06K 17/0025* (2013.01); *H01Q 1/2216* (2013.01); *H01Q 9/04* (2013.01); *H01Q 9/0421* (2013.01); *H01Q 21/29* (2013.01)

(56) References Cited

U.S. PATENT DOCUMENTS

| | | | | |
|---|---|---|---|---|
| 4,812,855 | A | * | 3/1989 | Coe .................. H01Q 9/065 343/700 MS |
| 5,192,954 | A | | 3/1993 | Brockelsby et al. |
| 5,280,286 | A | * | 1/1994 | Williamson ............ G01S 7/024 342/364 |
| 5,689,239 | A | | 11/1997 | Turner et al. |
| 2002/0190520 | A1 | * | 12/2002 | Garross .................. G09F 3/00 283/67 |
| 2005/0045723 | A1 | | 3/2005 | Tsirline et al. |
| 2005/0045724 | A1 | | 3/2005 | Tsirline et al. |
| 2005/0058483 | A1 | * | 3/2005 | Chapman ............... B41J 3/4075 400/76 |
| 2006/0000907 | A1 | | 1/2006 | Forster |

FOREIGN PATENT DOCUMENTS

| | | | |
|---|---|---|---|
| WO | 2005/022445 | 3/2005 | |
| WO | WO 2006035881 A1 * | 4/2006 | ............... H01Q 3/24 |

OTHER PUBLICATIONS

Written Opinion of the International Searching Authority for International Application No. PCT/US2007/079172 dated Apr. 18, 2008. (copy available in U.S. Appl. No. 11/850,489 to which priority is claimed).

International Search Report for International Application No. PCT/US2007/079172 dated Apr. 18, 2008. (copy available in U.S. Appl. No. 11/850,489 to which priority is claimed).

Xianming Qing and Ning Yang; 2.45 Ghz Circularly Polarized RFID Reader Antenna; IEEE; 2004; pp. 612-615 (XP10743394). (copy available in U.S. Appl. No. 11/850,489 to which priority is claimed).

Ron Schmitt; Understanding electromagnetic fields and antenna radiation takes (almost) no math; EDN; Mar. 2, 200; pp. 77-88; available at <https://www.ednmag.com>. (copy available in U.S. Appl. No. 11/850,489 to which priority is claimed).

Constantine A. Balanis; Chapter 2—Fundamental Parameters of Antennas: Paragraph 2.2.4—Field Regions; Antenna Theory: Analysis and Design; 2005; pp. 34-36; Third Edition; John Wiley & Sons, Inc. (copy available in U.S. Appl. No. 11/850,489 to which priority is claimed).

David M. Pozar; Paragraph 2.5—The Quarter-Wave Transformer; Microwave Engineering; 2005; pp. 73-76; Third Edition; John Wiley & Sons, Inc. (copy available in U.S. Appl. No. 11/850,489 to which priority is claimed).

\* cited by examiner

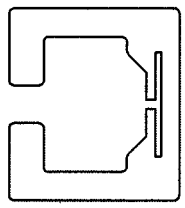
FIG.12a
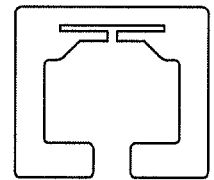
FIG.12b
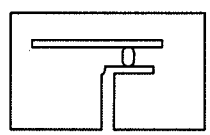
FIG.12c
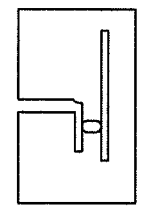
FIG.12d
FIG.12e
FIG.12f
FIG.12g
FIG.12h
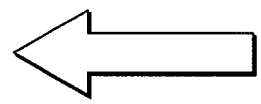 SMART CARD FEEDING DIRECTION

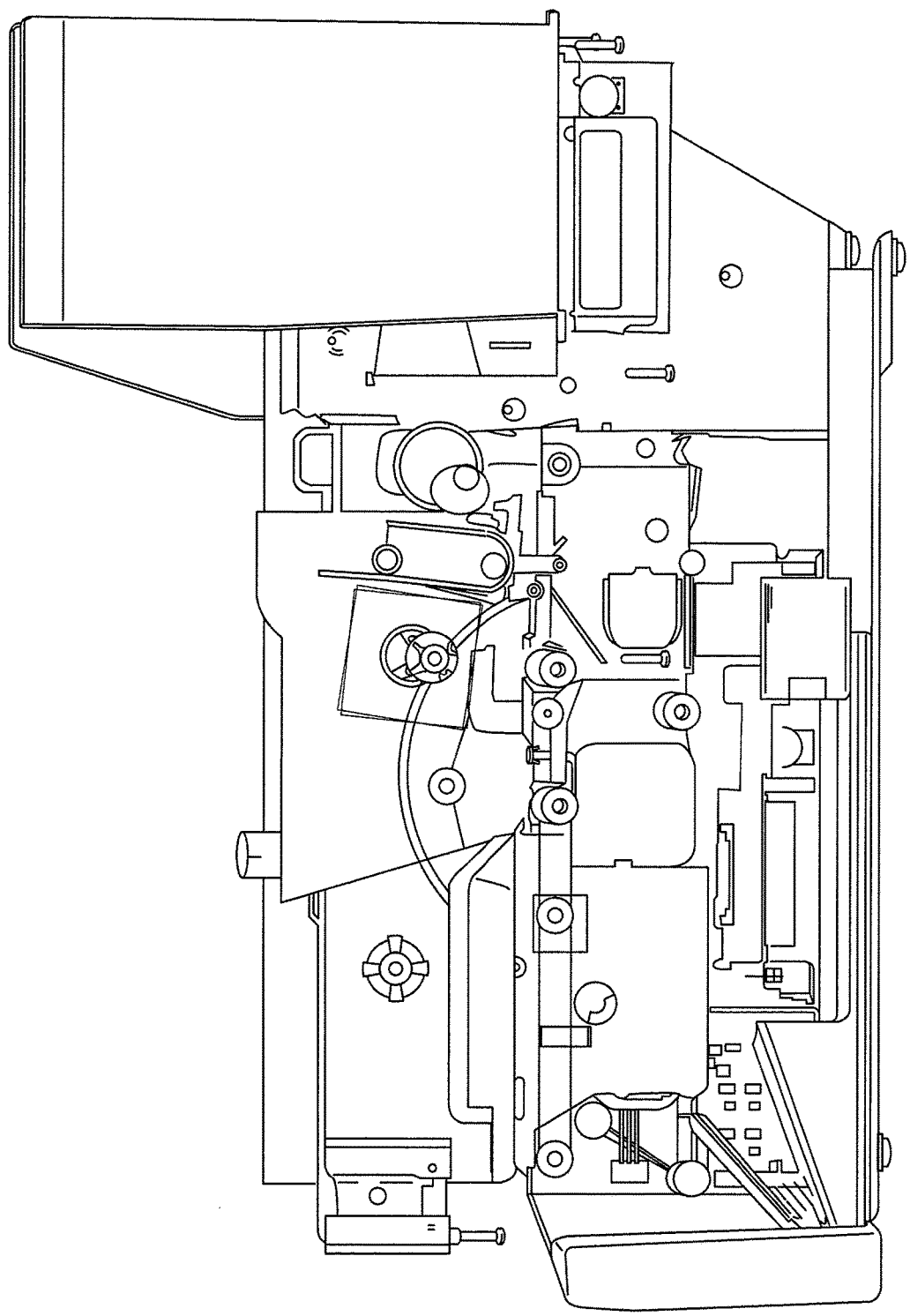

RFID SYSTEM AND ASSOCIATED ANTENNA-COUPLER

CROSS-REFERENCE TO RELATED APPLICATION

The present application is a continuation application of U.S. patent application Ser. No. 11/850,489, filed Sep. 5, 2007, which claims the benefit of U.S. Provisional Application No. 60/826,489, filed Sep. 21, 2006, each of which are hereby incorporated by reference in its entirety.

BACKGROUND OF THE INVENTION

Field of the Invention

The present invention generally relates to systems configured to print indicia on a surface of a smart media and communicate data to and from an associated transponder of the smart media and, in particularly, to spatially selective antenna-couplers of such systems capable of selectively communicating with a targeted transponder from among a group of adjacent transponders.

Description of Related Art

Printers are used to print text, graphics, and other indicia on a variety of media, including media having data storage devices such as magnetic strips, memory components, radio frequency identification (RFID) tags, barcodes, optical devices, and the like. For purposes of the present invention and appended claims the term "information card" shall refer to a printable media that is adapted to convey and/or contain information. A credit card is an exemplary information card that conveys information in the form of printed indicia and contains information that is stored as data on a magnetic strip. This data is retrieved simply by swiping the card's magnetic strip in front of a reader as will be apparent to one of ordinary skill in the art.

Smart cards are information cards having a memory for storing data and a device for accessing the memory. Contactless smart cards use an antenna or other similar devices to communicate wirelessly with a reader. Other types of smart cards communicate with a reader based on direct electrical contact between conductors or "contacts" defined on the card (e.g., copper or gold plated contacts) and similar conductors disposed on the reader.

The printed information conveyed by an information card is typically created during printing operations that are distinct from the encoding operations used to write data to the information card's memory. For example, a blank information card may be fed through a printer to print text, graphics, barcodes, etc., to either side or both sides of the information card. Data is conventionally written to the card memory before or after such printing operations. In this regard, the same printer can be used for printing various cards, regardless of the type of encoding to be performed. Similarly, a single electronic communication device or reader can be used to encode various cards, regardless of the type of printing to be performed. However, separate operations for printing and encoding can increase the time and expense necessary to manufacture information cards. Further, care must be taken to ensure that the printed and electronically encoded information for each card correspond to one another. Said differently, if the cards are taken out of order between the printing and encoding operations, such cards may inadvertently receive printed information that was intended for a first card type and electronic data that was intended for a different card type. In addition, different printing and encoding devices typically require separate electrical connections to one or more host computers that generally control such devices through multiple communication ports.

Separate printing and encoding operations are typically controlled by a host computer using separate software for controlling each of the different operations. For example, if a change in the printing operation is to be effected, an operator typically accesses a first software program on the host computer. To make a change to the encoding operation, the operator instead accesses a second software program on the computer. This can complicate the operator's role, possibly increasing the time required for making changes or verifying an operation and also increasing the risk of operator error.

Thus, there exists a need for a printer/encoder that addresses the deficiencies noted above and achieves multiple other benefits as will be described in greater detail below.

SUMMARY

The present invention may address some of the deficiencies discussed above by providing a system that may be configured to print and encode media, such as cards with associated transponders. More specifically, the system may include a transceiver and a near field antenna-coupler for communicating with the associated transponders.

For example, according to an embodiment of the present invention, a system for selectively communicating with a targeted transponder from among a group of multiple adjacent transponders is provided. The system may include a transponder conveyance, a transceiver, and an antenna-coupler. The transponder conveyance is adapted to transport at least one targeted transponder from a group of multiple adjacent transponders through a transponder operating region. The transceiver is configured to generate one or more electrical signals. The antenna-coupler has first and second microstrips in a cross-like arrangement relative to each other. Each of the first and second microstrips is configured to transmit one or more electro-magnetic fields concentrated in a near-field region of the antenna-coupler based on the one or more electrical signals for communicating with the targeted transponder.

The antenna-coupler may further include a first port in communication with both of the first and second microstrips such that both of the first and second microstrips receive the one or more electrical signals concurrently. Or the system may further include a switch for sending the one or more electrical signals from the transceiver to either one of the first and second microstrips. In other words, the switch may be used to activate only one of the microstrips such that only one is transmitting the electro-magnetic fields or both microstrips may be activated such that both are transmitting electro-magnetic fields.

According to an embodiment, the first and second microstrips are spaced apart and separated by the at least one substrate. In another embodiment, the first and second microstrips are substantially co-planer and the first microstrip further includes a first section, a second section, and a bridge. The first section extends from a first end of the first microstrip to approximately the second microstrip. The second section extends from approximately the second microstrip to a second end of the first microstrip. And the first and second sections are linked through the bridge that extends around the second microstrip such that the first and second microstrips do not intersect.

The antenna-coupler may further include a first resistive load for terminating the first microstrip and a second resistive load for terminating the second microstrip. The first microstrip defines a characteristic impedance which may be less than the first resistive load. Similarly, the second microstrip defines a characteristic impedance which may be less than the second resistive load.

Each of the first and second microstrips has a tapered profile. For example, the tapered profile may be a modified bow-tie. Each of the first and second microstrips defines a length. According to an embodiment, the length is substantially equal to a multiple of one half a wavelength of an operational frequency of the antenna-coupler. The operational frequency of the antenna-coupler may be selected from a range of frequencies from 300 MHz to 3 GHz or from a range of frequencies from 860 MHz to 960 GHz.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 11b is a side section view of the antenna-coupler of FIG. 11a;

Figure 11A:
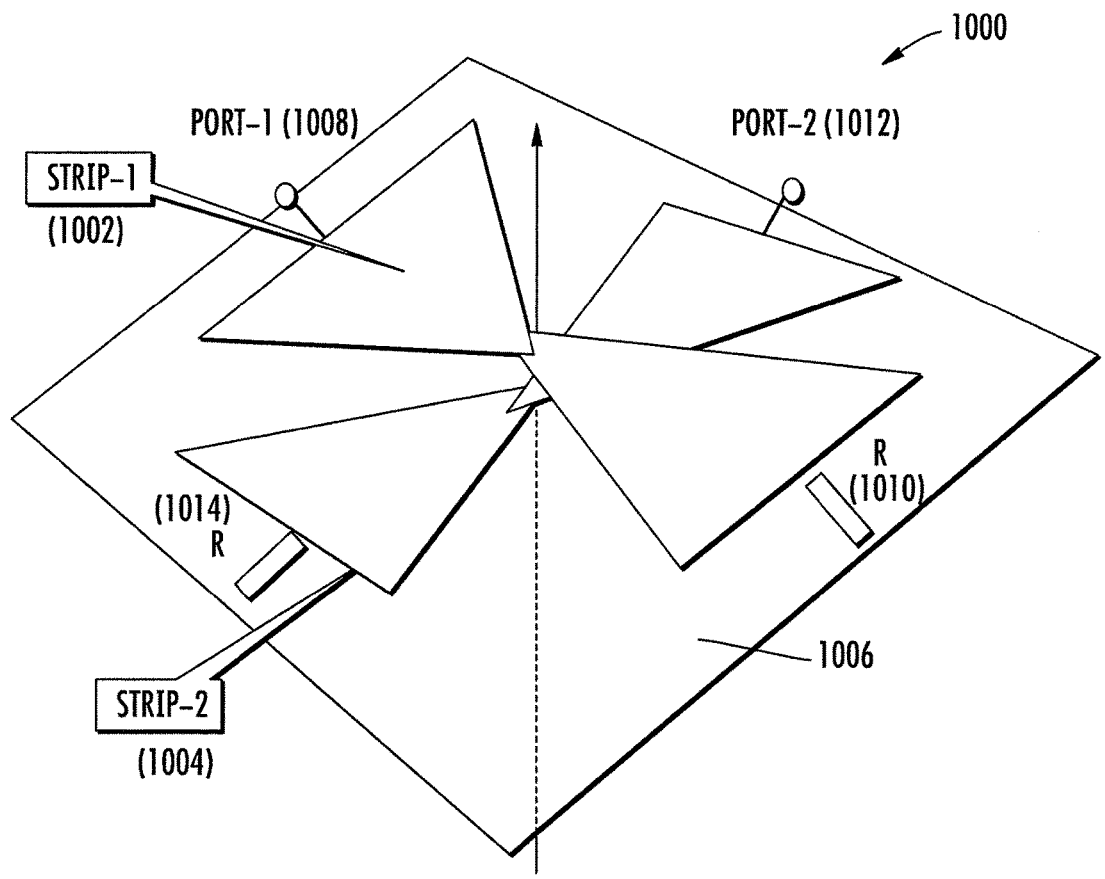
FIG. 11a is a perspective view of an antenna-coupler according to an embodiment of the present invention.
Figure 13A:
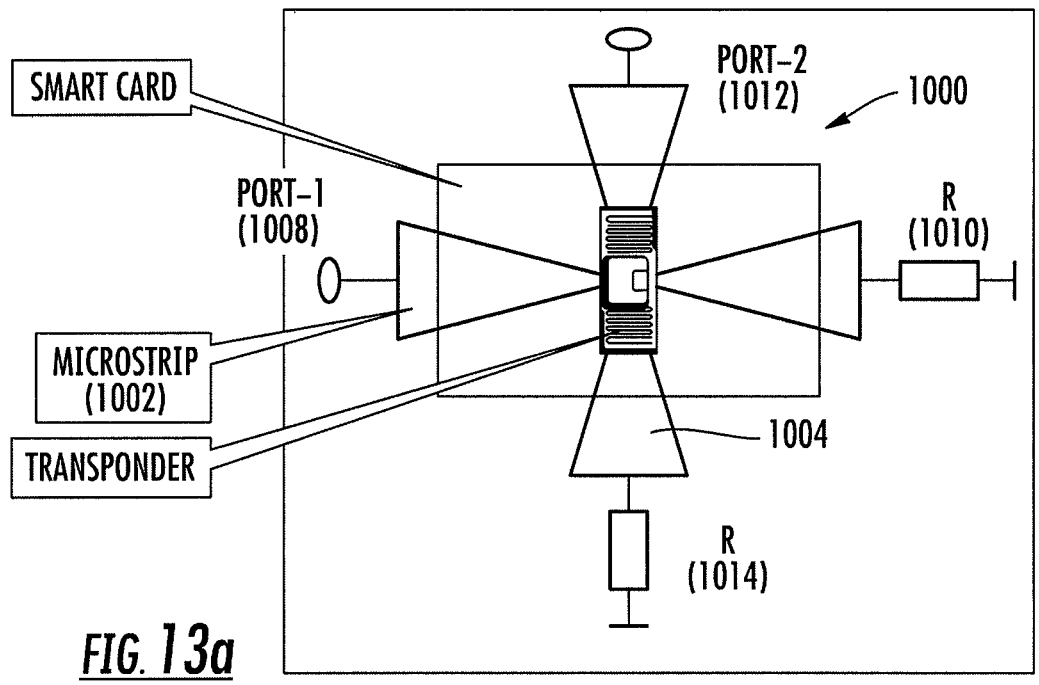
Figure 13B:
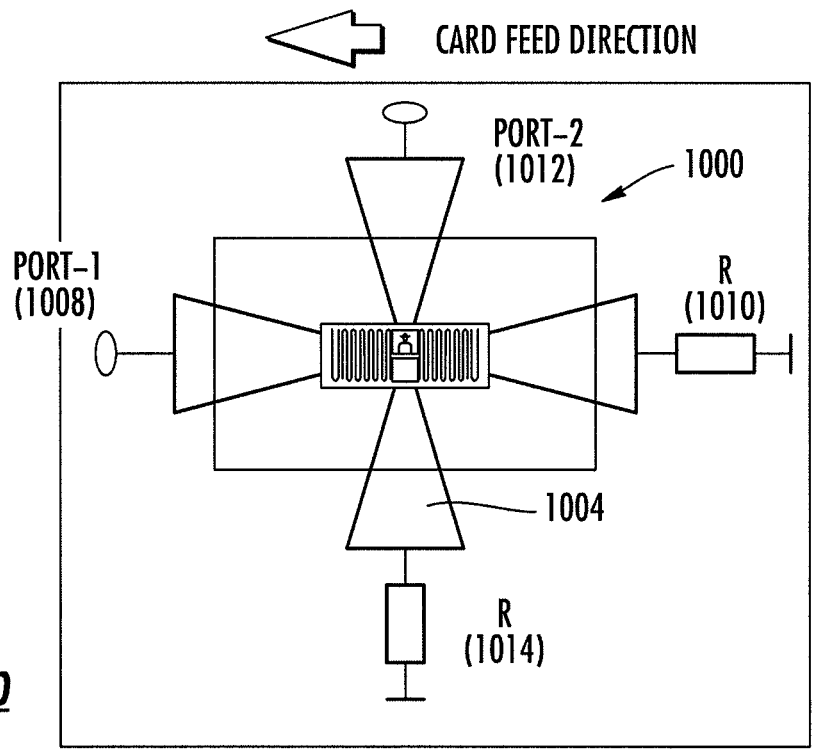
Figure 14:
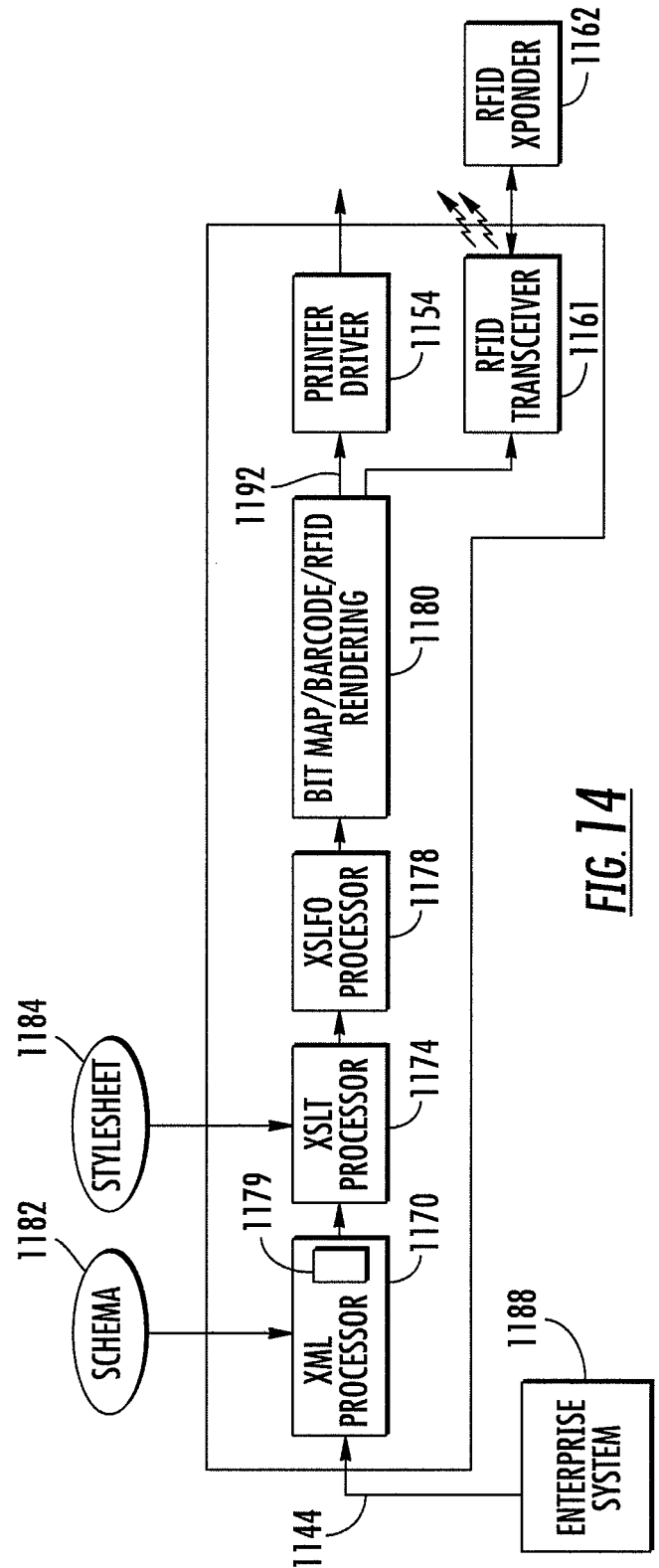
Figure 16A:
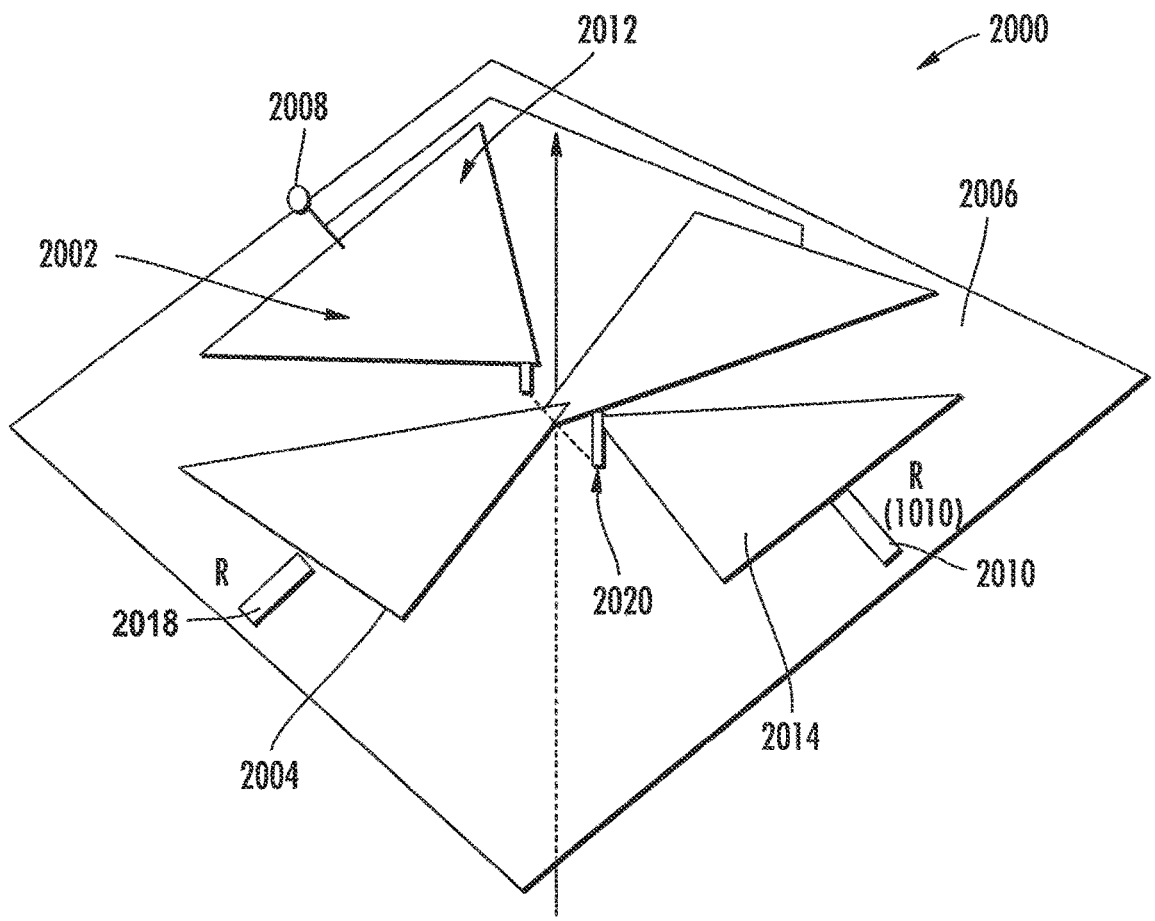
Figure 16B:
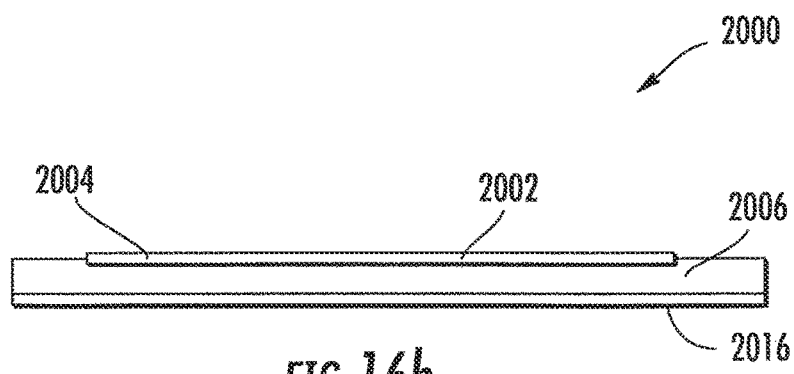
Figure 17A:
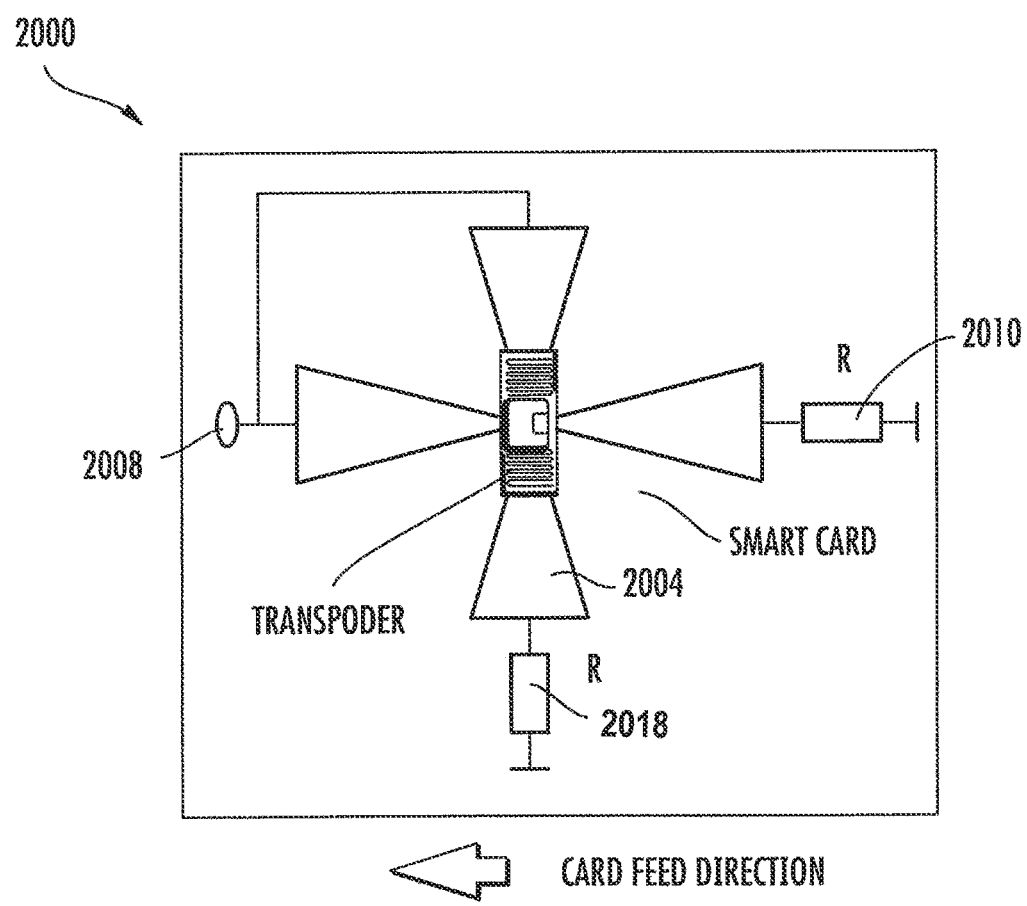
Figure 17B:
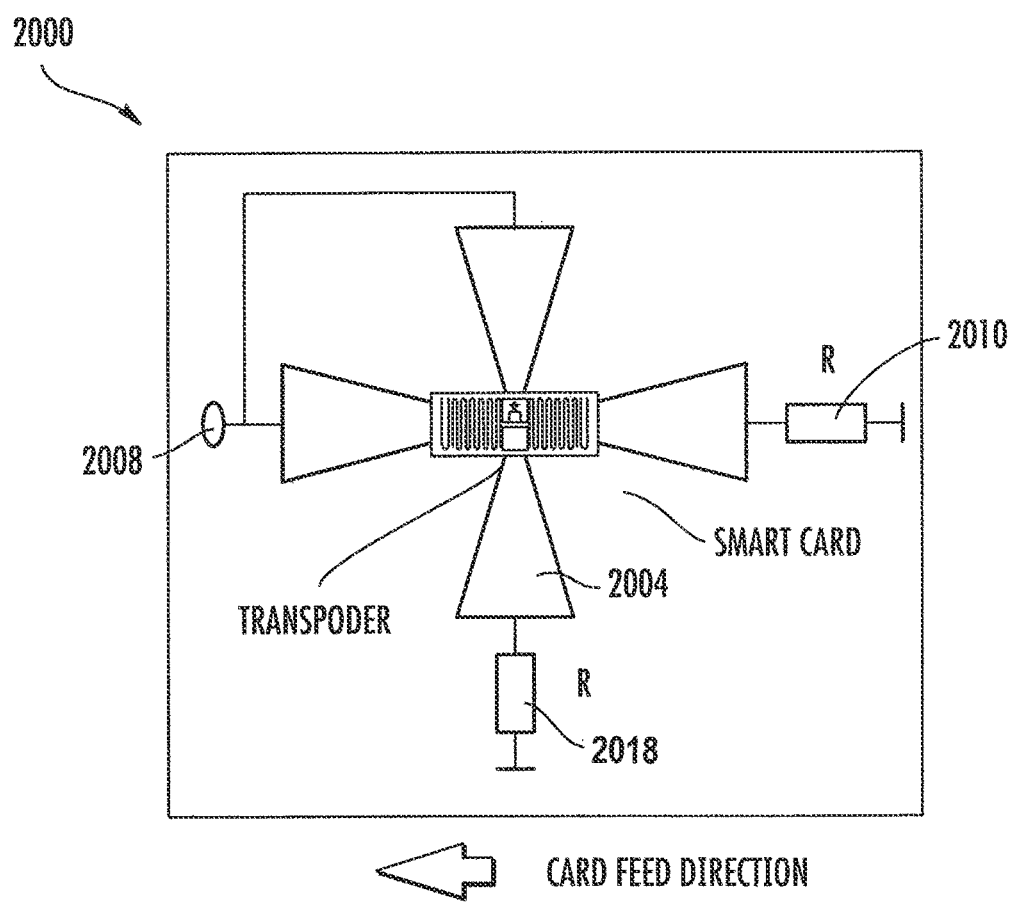

FIGS. 12a-h illustrate various types of RFID transponders in landscape and portrait orientations relative to the feed direction according to an embodiment of the present invention;

FIG. 13a illustrates crosswise transponder movement over the antenna-coupler of FIG. 11a;

FIG. 13b illustrates lateral transponder movement over the antenna-coupler of FIG. 11a;

FIG. 14 is a high-level system block diagram of a XML system according to one embodiment of the present invention;

FIG. 15 is a section view schematically illustrating a printer according to another particular embodiment of the present invention;

FIG. 16a is a perspective view of an antenna-coupler according to another embodiment of the present invention;

FIG. 16b is a side section view of the antenna-coupler of FIG. 16a;

FIG. 17a illustrates crosswise transponder movement over the antenna-coupler of FIG. 16a; and FIG. 17b illustrates lateral transponder movement over the antenna-coupler of FIG. 16a.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Smart Media Printer and Encoder

Various embodiments of the present invention are directed to a printer that is configured to communicate with a host device for receiving a signal and, in response to the signal, printing indicia on a media and/or electronically storing data on an electronic storage device associated with the media. According to one embodiment of the present invention, the printer includes a print device for printing human or machine-readable indicia, such as graphics, text, barcodes, or the like on one or more surfaces of the media. A controller can be configured to control the print device. The printer also includes at least one communication device for communicating with the media according to a select protocol. For purposes of this application, "communicating" with the media may include writing information to or reading information from the media. In other words, a communication device communicating with the media may include such reading and writing operations as encoding an electronic storage device or magnetic strip on the media, writing information on the media in the form of a barcode or hologram, reading information from an electronic storage device, barcode, hologram, or magnetic strip, etc.

Each electronic communication device (also referred to herein simply as "a communication device") can be configured to store data on the media and/or read data therefrom using different communication protocols. For example, each of the electronic communication devices can be adapted for various types of communication with various types of electronic storage devices that may be provided on the media. In particular, the media can include a magnetic strip, a contactless (i.e., non-contact) device such as an RFID tag or other contactless memory circuitry, a contact device such as an integrated circuit with contact terminals, and the like. Alternatively, one or more of the electronic communication devices can be configured to store or read data by disposing or detecting material on the media, e.g., fluorescent text, a hologram, encoded pixilated images, or the like. In any case, the printer can include multiple types of electronic communication devices, each of which can communicate using a different communication protocol, so that the printer can read and/or write to various types of media.

Each electronic communication device of the printer can be integral to the printer so that the printer can perform each of the printing and electronic communication operations. Further, the printer can perform both operations as part of a combined process, i.e., while the media is being fed through the printer in one or more pass along a feed or conveyance path thereof. The printing and electronic communication can be controlled by a single controller, such as a microprocessor or the like that communicates with each of the electronic communication devices. In addition, the electronic communication devices can communicate with an external controller, such as a host computer, which can be the same host computer that controls the operation of the printer functions of the printer. In fact, the printer can communicate with the host computer or other controller via a single, integrated communication port, for example single wireless communication port, and/or a single communication cable. For example, the cable can include conductive elements configured for communication using one or more protocols such as parallel, serial, universal serial bus (USB), Ethernet, and the like for controlling each of the different printing and reading/writing operations.

According to one aspect of the invention, the host computer, the cable, and the communication port of the printer are configured for communicating signals for printing as well as communicating with the media via the different electronic communication devices so that different types of communication can be performed. That is, the host device can communicate a signal to the printer via the integrated communication port, and the signal can be representative of the indicia and data to be encoded on the media. The electronic communication devices can also be configured to read data from the media according to the respective protocols, and any data read from the media or related to the printing or encoding of the media can be communicated to the host via the same integrated communication port.

In addition, the host computer can be programmed to control each of the operations of the printer using an integral software program. For example, the host computer can be configured to perform a plurality of operations of an integral software program, which is configured to control the printing of the indicia by the print device and the communication of the data by the communication device(s). The integral software program can provide a single user interface for controlling the printing of the indicia by the print device and the communication of the data by the first and second electronic communication devices. Thus, an operator can control the printing and reading/writing communication operations of the printer using one software program, and the software program can have a single user interface therefor.

According to one embodiment, the present invention provides a method of printing on a media in a printer and selectively electronically storing data on the media according to one of multiple communication protocols in response to a signal received from a host device. A signal that is representative of an indicia and data is received from the host device via an integrated communication port. The indicia is printed on a surface of the media according to the signal. One of multiple communication protocols is selected for storing the data, and, in some cases, one of multiple electronic communication devices is selected according to the select communication protocol. Each electronic communication device can be configured to store the data on the media using a different communication protocol. The communication devices and/or communication protocols can also be used for reading data from the media. Thus, the data can be stored on the media according to the signal using the select communication protocol and/or the select communication device. The printing, selecting, and storing operations can be controlled and/or performed by a controller, and these operations can be performed during a combined operation, e.g., while the media is fed in one or more passes through the printer. The printing and storing operations can be controlled by a single, i.e., integral, software program that includes a plurality of operations. Further, a single user interface can be provided for controlling the printing of the indicia and the storing of the data.

According to another embodiment, the present invention also provides a computer program product for communicating between a host device and a printer. The computer program product includes a computer-readable storage medium having computer-readable program code portions stored therein. The computer-readable program code portions can include a first executable portion for communicating a signal representative of an indicia and data to the printer so that the signal controls the printer to print the indicia on a surface of a media and store the data on the media according to a select one of multiple communication protocols. The first executable portion can be configured to select one of multiple electronic communication devices of the printer according to the select communication protocol and thereby control the select communication device to store the data on the media. For example, the data can be stored on a magnetic strip, an RFID tag, or an integrated circuit, or the data can be stored using fluorescent text, a barcode, a hologram, or encoded pixilated images. The first executable portion can be configured to communicate with the printer via the integrated communication port using a parallel port, a serial port, a universal serial bus (USB) port, or an Ethernet port, and communication by each type of port can be performed using a communication protocol that corresponds to the particular type of port that is used, e.g., a USB protocol can be used when communicating via a USB port. For example, the first executable portion can communicate the signal to a controller of the printer via an integrated communication port so that the controller is configured to receive the signal and print the indicia and store the data according to the signal. A second executable portion of the computer program product can provide an integral user interface for controlling the printing of the indicia and the storing of the data. A third executable portion can also be provided to read data from the media according to the select communication protocol.

Figure 1:
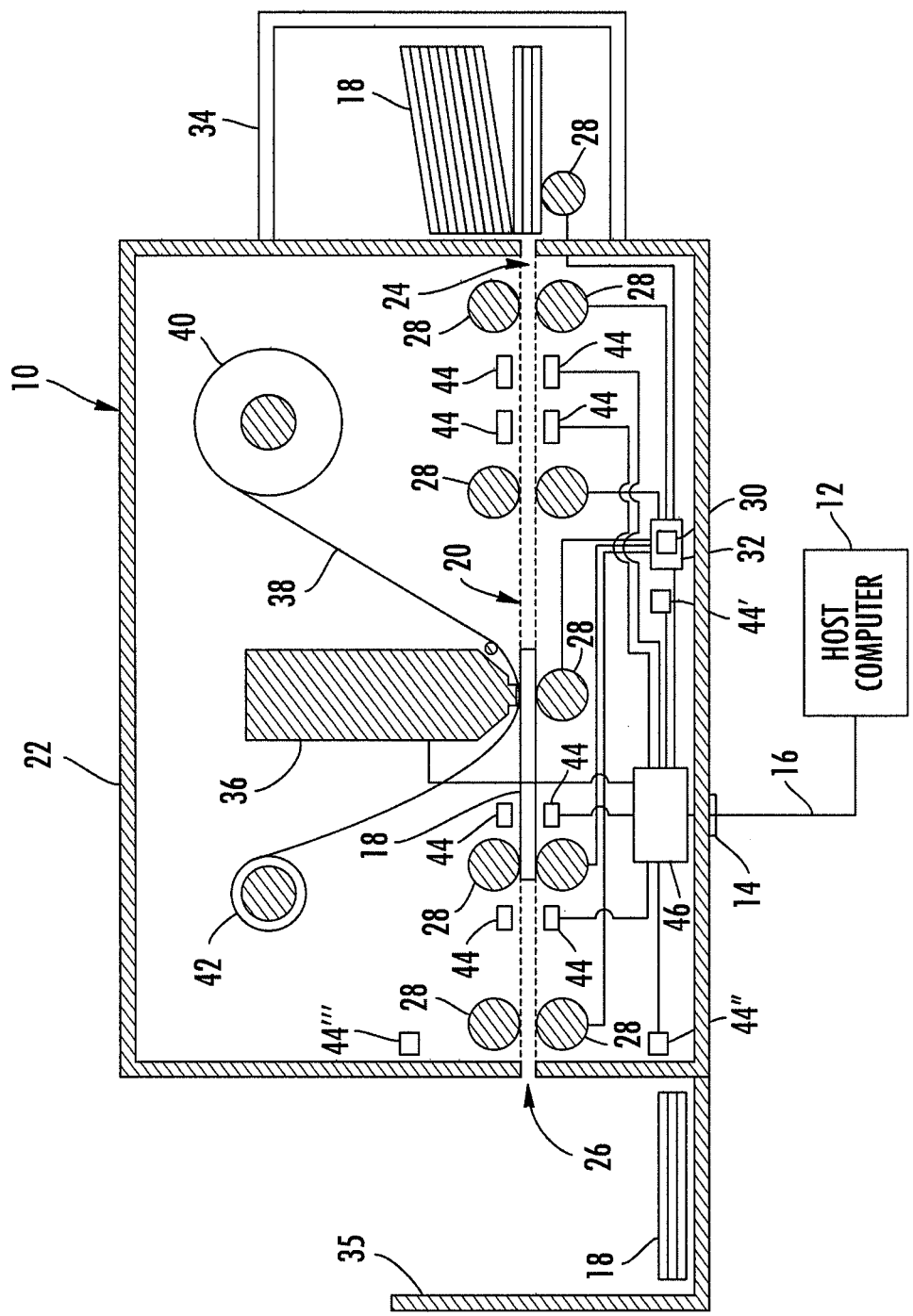
FIG. 1 is a section view schematically illustrating a printer according to one embodiment of the present invention.
Figure 2:
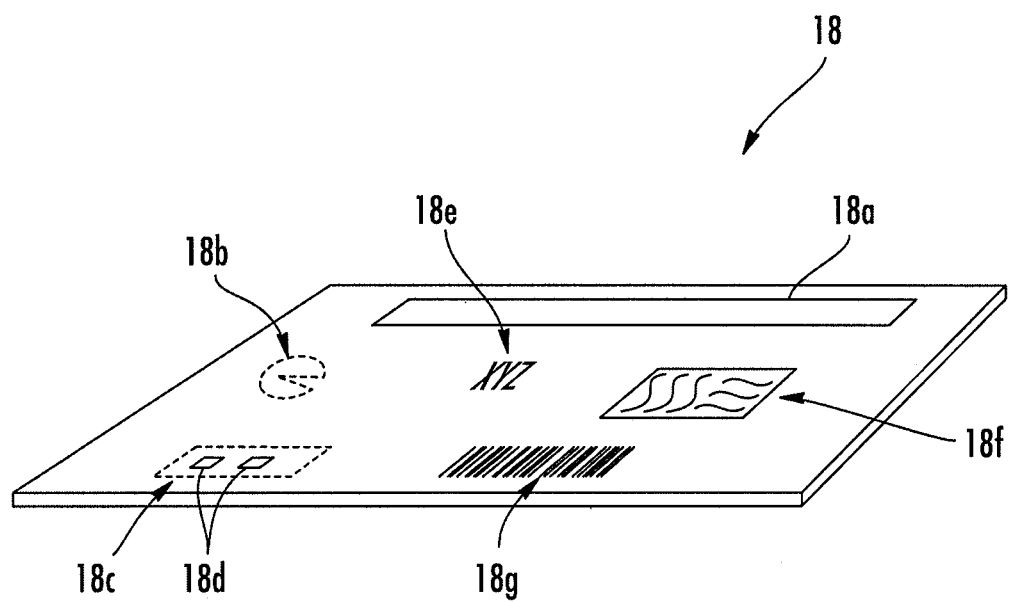
FIG. 2 is a perspective view illustrating an exemplary media card that can be processed with a printing and reading/writing operation of the printer of FIG. 1 according to one embodiment of the present invention.

Referring now to the figures and, in particular, to FIG. 1, there is shown a printer 10 according to one embodiment of the present invention. The printer 10 is electrically connected to a host computer 12 via an input/output (I/O) port 14 and a data communication cable 16. The printer 10 illustrated in FIG. 1 is adapted for printing cards 18, such as information cards. As shown in FIG. 2, the card 18 can include one or more magnetic strips 18a, contactless devices such as RFID tags 18b, contact devices such as an integrated circuit 18c with a memory and contact terminals 18d, fluorescent text 18e, holograms 18f, a barcode 18g or otherwise encoded pixilated image, or the like.

The printer 10 can include features of the P310i, P330i, P430i, and P530i Printers available from Zebra Technologies Corp., which are generally configured for printing cards. However, it is appreciated that the printer 10 can alternatively be adapted to receive other types of media such as labels, paper or cardboard sheets or strips, envelopes, tickets, and the like. As illustrated in FIG. 1, the printer 10 defines a feed or conveyance path 20 that extends through a housing 22 of the printer 10 from an entrance 24 to an exit 26. The conveyance path 20 generally defines the path of travel of the media, such as the cards 18, through the printer 10. Rotatable rollers 28 or other media support and transport devices, such as one or more belts, may be provided along the conveyance path 20 to feed or convey the media therethrough. The rollers 28 are typically rotated by one or more electric motors 30, which are controlled by a motor driver 32, to feed the cards 18 or other media along the conveyance path 20 through the printer 10 during operation. Thus, during a typical printing operation of the printer 10, a stack of the cards 18 can be provided in a hopper 34 proximate to the entrance 24 of the conveyance path 20, and the cards 18 can be individually fed from one side of the stack and then fed along the conveyance path 20 to the exit 26. The printer 10 can include an output hopper 35 proximate the exit 26 of the conveyance path 20 for collecting the cards 18 after they are fed along the conveyance path 20.

Figure 3:
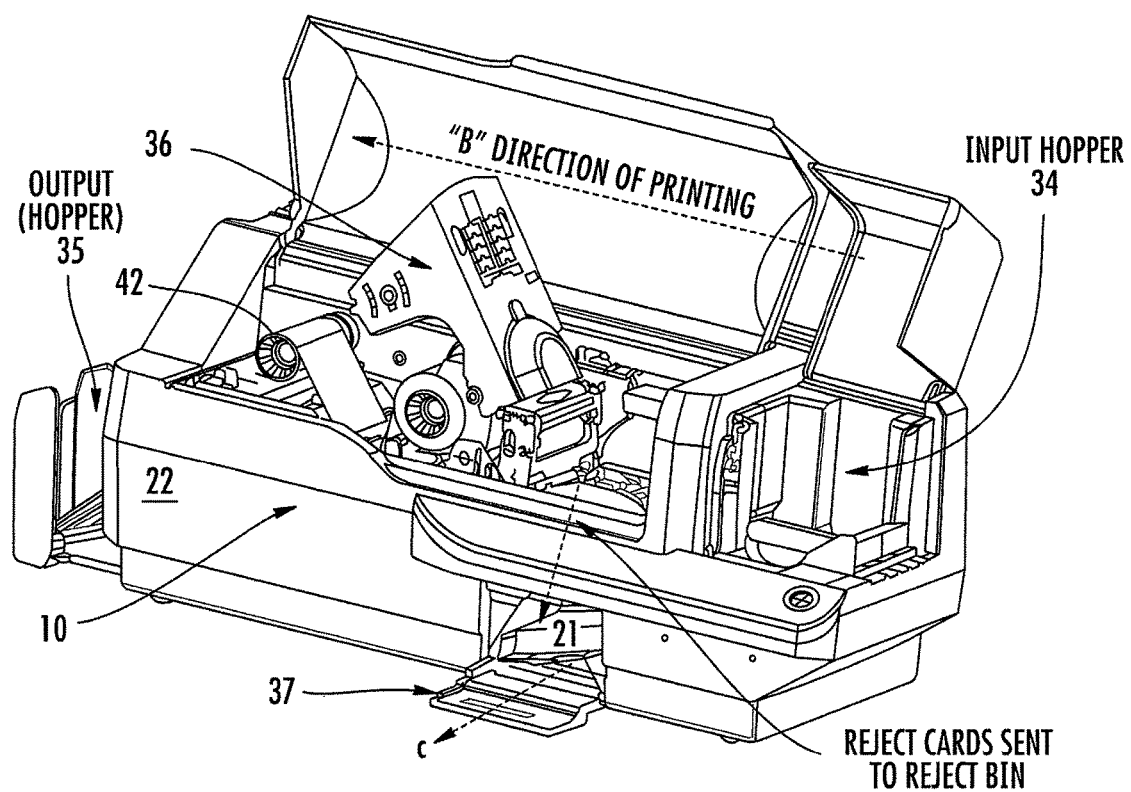
FIG. 3 is a perspective view illustrating a printer having a reject tray according to one embodiment of the present invention.

In one embodiment, such as in the embodiment depicted by FIG. 3, the printer 10 can include a reject tray 37 into which rejected cards are deposited. For example, the printer 10 may include a method and/or a device for checking whether the cards 18 or other media have been printed, encoded, or otherwise communicated with effectively. If the printer 10 determines that the cards 18 have not been effectively communicated with, the printer 10 may be configured to send the cards 18 into the reject tray 37 instead of sending the cards to the output hopper 35. The printer may have a second conveyance path 21 configured to feed a rejected card from the conveyance path 20 to the reject tray 37.

Referring again to FIG. 1, a head 36 of the printer 10 can be a device for disposing a dye onto stock media. For example, a thermal dye ribbon 38 can extend from a supply spool 40 to a take-up spool 42 with the ribbon 38 disposed between the head 36 and one of the cards 18 in the conveyance path 20. Dyes of one or more colors may be carried on the ribbon 38, and the head(s) 36 is configured to press the ribbon 38 against the card 18 and/or heat the ribbon 38 at particular locations so that the dye in the particular locations of the ribbon 38 is transferred to the card 18. Such a thermal printing operation is described, e.g., in U.S. Pat. No. 6,151,037 to Kaufman, et al.; U.S. Pat. No. 5,978,004 to Ehrhardt; and U.S. Pat. No. 5,657,066 to Adams, et al., each of which is assigned to the assignee of the present application, and the contents of each of which are incorporated herein in their entirety by reference. In other embodiments of the present invention, the printer can be alternatively configured to print, e.g., using a retransfer printing mechanism, direct thermal printing mechanism, or other printing mechanisms.

As each card 18 is fed along the conveyance path 20 of the printer 10, the head 36 can dispose one or more colors onto the card 18 in a predetermined pattern. In some cases, the ribbon 38 can define repeating frames of panels, each panel having a dye of a different color than the other panels of the same frame. For example, each frame can include panels that are yellow, magenta, and cyan, respectively. The cards 18 can be alternately advanced and retracted in opposite directions along the conveyance path 20 so that each card 18 is fed under the head 36 multiple times, during which the head 36 can print different colors from the different panels of a frame.

The printer 10 is also configured to communicate data to and/or from the media using one or more electronic communication devices 44. The devices 44 can generally be used to read data from the media and/or write data to the media. For example, one or more of the devices 44 can be adapted to communicate with a particular type of electronic storage device provided on the media, i.e., on a surface of the media, embedded within the media, or otherwise associated with the media. Thus, the printer 10 can be used to selectively communicate with the media according to the type of media and the desired form of data storage. In fact, the printer 10 can be used to process various types of media and can communicate accordingly using one or more protocols for each media. The electronic communication devices 44 can be disposed on either or both sides of the conveyance path 20, and, as illustrated in FIG. 1, the devices 44 can be located at various positions throughout the printer 10. In one embodiment, the printer 10 includes two or more electronic communication devices 44 that are disposed internal to the housing 22 of the printer 10 and configured to communicate using at least two different protocols. Any number of the electronic communication devices 44 can be activated during processing of the media.

In one embodiment, one or more of the electronic communication devices 44 may be a modular component that is easily replaced without significant interruption of printing operations. For example, each of the electronic communication devices 44 disposed within the housing 22 of the printer 10 can be configured to be interchangeable with each other and/or with other communication devices. That is, the electronic communication devices 44 can be similar in size, shape, structure, or other physical configuration. In some cases, the electronic communication devices 44 can also be configured to connect to the printer 10 using similar electrical connections. Thus, the communication devices 44 can be quickly and easily replaced, e.g., if it is desired to communicate with the media using an electronic communication device that is not presently provided in the printer 10, to adjust one of the electronic communication devices 44 in a particular position or orientation to correspond to a particular type of media being processed, or if any of the electronic communication devices 44 require maintenance or repair.

The printer 10 includes a controller 46 for communicating with the host 12 and controlling the operations of the printer 10. As shown in FIG. 1, the controller 46 can be a single integral device that controls the feeding, printing, reading, writing, and other operations of the printer 10. However, it is also appreciated that the functions of the controller 46 can be shared by multiple devices, such as a separate print controller, communication controller, motor driver controller, and the like.

Figure 4:
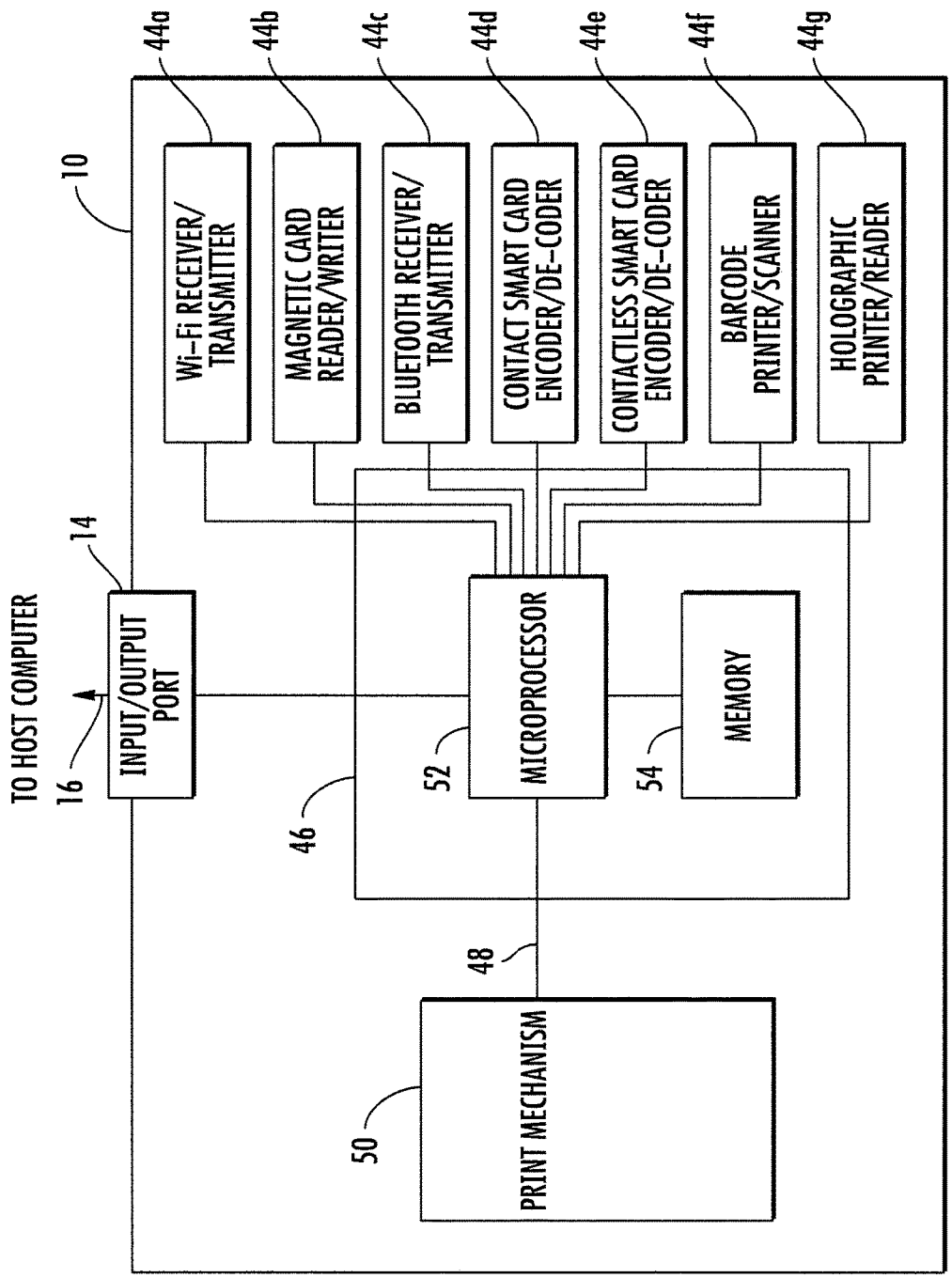
FIG. 4 is a block diagram schematically illustrating a printer according to another embodiment of the present invention.

FIG. 4 illustrates a controller 46 according to one embodiment of the present invention. The controller 46 is configured to communicate with the host computer 12 via the cable 16 and I/O port 14. The controller 46 is also configured to communicate via an internal electrical connection 48 with the print mechanism 50, i.e., the roller motor(s) 30 and/or motor driver 32, one or more print heads 36, a printer display, and other equipment of the printer 10. The controller 46 includes a microprocessor 52 or other electrical control device capable of receiving a signal from the host computer 12 and responding by controlling the print and communication operations accordingly. A memory 54 can also be provided, e.g., for buffering signals from the host computer 12, for storing operating instructions, and the like. Thus, the host computer 12 can perform a print operation by sending a signal to the controller 46 instructing the controller 46 to control the print mechanism 50 accordingly to feed, i.e., convey, the media and print text, graphics, or other indicia on one or both sides of the media.

The microprocessor 52, or alternatively another device of the controller 46, is also configured to communicate with the electronic communication devices 44, designated by reference numerals 44a-44g and referred to collectively by numeral 44. As shown in FIG. 4, the controller 46 is electrically connected to a Wi-Fi receiver/transmitter 44a, a magnetic card reader/writer 44b, a Bluetooth receiver/transmitter 44c, a contact smart card encoder/de-coder 44d, a contactless smart card encoder/de-coder 44e, a barcode printer/scanner 44f, and a holographic printer/reader 44g.

The electronic communication devices 44 are generally configured to communicate using different protocols. For example, the Wi-Fi receiver/transmitter 44a is configured to detect and/or generate Wi-Fi signals for communicating with another Wi-Fi device, such as a Wi-Fi receiver disposed on the card 18 or other media. Similarly, the Bluetooth receiver/transmitter 44c is configured to detect and/or generate a Bluetooth wireless signal.

The first smart card encoder/de-coder 44d is a "contact" device configured to transmit and/or receive a signal for writing to and/or reading from a smart card via electrical contacts that touch corresponding contacts of the smart card. For example, the encoder/decoder 44d can communicate data to and/or from an integrated circuit with a memory that is disposed on the card 18 via contacts 18d.

The second smart card encoder/de-coder 44e is a contactless, i.e., non-contact, device that is configured to transmit and/or receive a radio frequency (RF) signal to communicate data to and/or from an electronic data storage device on the media, such as an RFID tag or an electronic article surveillance (EAS) RF resonant security element. In one embodiment, the smart card encoder/de-coder 44d is configured to communicate in the ultra-high-frequency (UHF) electromagnetic energy band. In another embodiment, the encoder is configured to communicate in the high-frequency (HF) band. UHF encoders generally transmit and receive signals in the 300 MHz-3 GHz range, and preferably in the 860-960 MHz range, while HF encoders generally transmit and receive signals in the 13.56 MHz range.

The magnetic card reader/writer 44b includes a magnetic head that is configured to read and/or write to a magnetic strip on a media. The barcode printer/scanner 44f is configured to print and/or scan a barcode or other printed indicia on the media. For example, the barcode can be scanned by directing a laser or other optical radiation at the barcode and detecting reflectance therefrom. In some cases, the printing mechanism 50 can be used to print the barcode on the media, and the barcode communication device 44f can be a scanner that is configured to read but not write the bar code. Similarly, the holographic printer/reader 44g can be configured to dispose material for forming a holographic image and/or to detect such material for decoding the image, e.g., a hologram formed as an overlay on the media. However, in some embodiments, the hologram communication device 44g can be configured to detect the hologram, which can be printed by the printing mechanism 50 or otherwise. Further, each of the barcode and hologram communication devices 44f, 44g can alternatively be configured for printing or detecting other indicia such as alphanumeric symbols, text, graphics, colored markings, or the like. It is appreciated that the printer 10 can include any of these or other communication devices.

The electronic communication devices 44 can be provided at various locations throughout the printer 10 and can be positioned adjacent the conveyance path 20 or remotely from the conveyance path 20. For example, in one embodiment, one or more communication devices 44 are provided at a position that is spaced from the conveyance path 20 and configured to communicate wirelessly with a contactless device, such as an RFID tag 18b, supported on the card 18. Exemplary positions for the electronic communications devices 44 that are remote from the conveyance path 20 are illustrated in FIG. 1 and indicated by reference numerals 44', 44'', 44'''. The remotely positioned communication devices 44', 44'', 44''' are also referred to collectively with the other communication devices by reference numeral 44.

In addition, the electronic communication devices 44 can be configured to communicate with the card 18 at various times throughout the processing of the card 18 in the printer 10. For example, as illustrated in FIG. 1, one of the electronic communication devices 44' is provided generally below the print head 36 such that the electronic communication device 44' is in sufficient proximity with (though not adjacent to) the card 18 for communicating with the card 18 when the card is substantially positioned below the head 36 and available to the head 36 for printing. In particular, the electronic communication device 44' can be a contactless device, such as a contactless smart card encoder/de-coder, and the communication device 44' can be configured to read from and/or write to the card 18, such as to an RFID tag 18b on the card 18, while the head 36 is printing on the card 18 or while the card is otherwise positioned and ready for printing by the head 36. Thus, in some cases, the printer 10 can print on the card 18 while simultaneously or substantially simultaneously communicating with one or more data storage devices on the card 18, such as a magnetic strip 18a, RFID tag 18b, integrated circuit 18c, fluorescent text 18e, hologram 18f, barcode 18g, or the like.

Single Integrated Interface with the Host Device

As noted above, the host computer 12 and the controller 46 can communicate via the I/O port 14 and the cable 16. In particular, the host computer 12 can transmit signals to the controller 46 via the cable 16 and I/O port 14 for controlling the operation of the printer 10. Typically, the signal transmitted by the host computer 12 includes information for controlling an operation for printing the media by the printer 10, as well as information for controlling the communication with the media using the communication devices 44.

According to one embodiment of the present invention, the host computer 12 issues a signal having communication data corresponding, at least in part, to the particular communication device 44 that is to be used in a reading/writing operation of data storage devices supported by the media. For example, if it is desired for the controller 46 to encode data to data storage devices on the media using a select one of the electronic communication devices 44, information identifying or otherwise describing the particular communication device (or the type of communication or media) can be communicated to the host computer 12 by the controller 46, the operator, or otherwise. Thereafter, the host computer 12 can issue a signal using an appropriate protocol. That is, the data transmitted to the controller 46 can be in a format for use by the select communication device 44. For example, if a magnetic strip on the media is to be encoded with binary data, the data can be communicated to the controller 46 in a binary format. Alternatively, if graphical information is to be stored on the media, the data can be communicated to the controller 46 in any of various graphical formats. In other embodiments of the present invention, the controller 46 can be configured to format or otherwise process the data before the data is delivered to the appropriate communication device 44. Thus, in some cases, the host computer 12 can provide a signal that is received by the controller 46 and thereafter used by the controller 46 for communicating with any of various types of media.

In some cases, the controller 46 can also transmit information to the host computer 12 via the cable 16 and I/O port 14. For example, if any of the communication devices 44 are used for reading data from the media, that data can be communicated by the controller 46 to the host computer 12. In addition, the controller 46 can communicate other information to the host computer 12, such as the operational status of the printer 10, the progress or success of the printer 10 in a printing and/or reading/writing operation, the type of media in the printer 10, and the like.

Thus, the cable 16 and I/O port 14 can provide an integrated connection by which the printer 10 can receive data for printing to the media and can receive and/or transmit data that is being written to and/or read from the media, even if the data is provided in different protocols. In some cases, the controller 46 can include a multiplexer that transmits portions of the signal from the host computer 12 to a respective one of the devices 44, 50. Thus, a serial type communication between the host computer 12 and the controller 46 can be used to communicate data for simultaneous or generally contemporaneous printing and reading/writing operations.

Figure 5:
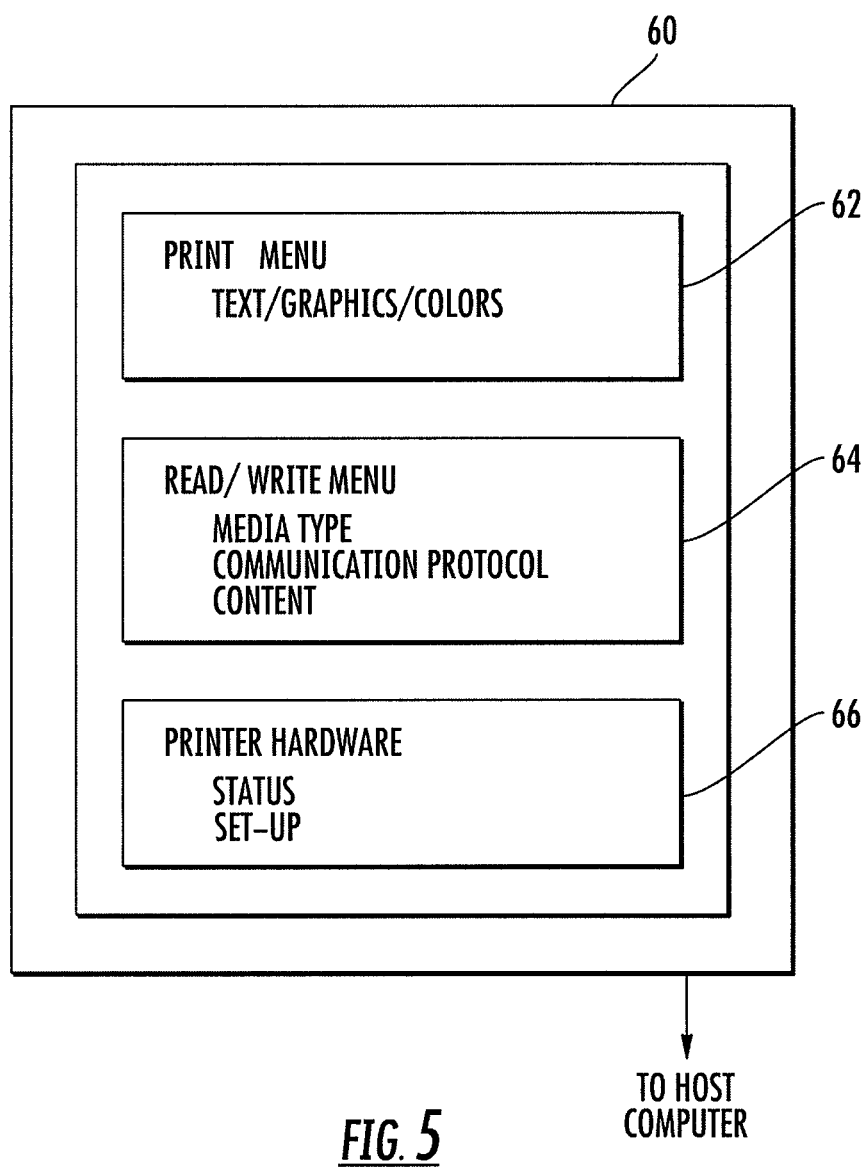
FIG. 5 is a schematic diagram illustrating a graphical user interface for use in conjunction with controlling a printer according to one embodiment of the present invention.

In addition, the printer 10 can be controlled by a single driver software program that is capable of controlling each of the printing and reading/writing operations of the printer 10. In this regard, FIG. 5 schematically illustrates a display 60, such as a cathode ray tube or liquid crystal display in communication with the host computer 12. The display 60 can be used to graphically output information to the operator (and request input from the operator) regarding the host computer 12, the printer 10, and operations thereof. In particular, as illustrated in FIG. 5, the driver software program for controlling the printer 10 can provide a graphical user interface on the display 60. The graphical user interface can be used to communicate information relating to both the printing and reading/writing operations of the printer 10. For example, the graphical user interface can provide a first submenu 62 for controlling the printing operation and a second submenu 64 for controlling the reading/writing operations. Each submenu 62, 64 can provide features for accessing information relating to the status of the respective operation and for entering information for changing the operation, e.g., for changing the text, graphics, colors, or the like that are to be printed on the media, or for indicating to the host computer 12 a change to the media type being used, the data to be communicated to/from the media, and the like. In this regard, the software can include instructions for inputting information from the operation, e.g., using typical input devices such as a keyboard, mouse, touchpad, trackball, microphone, or the like. A third submenu 64 can also be provided for accessing options relating to both of the printing and reading/writing operations, e.g., for verifying or changing the status or configuration of the printer 10 with the host computer 12, such as by adjusting aspects of the connection therebetween.

Other embodiments of the printer having an integrated interface are further disclosed in U.S. Patent Publication No. 2006/0049253, which is assigned to the assignee of the present application and which is hereby incorporated by reference in its entirety.

Location of Communication Device(s) and Timing of Communication Operations

Figure 6:
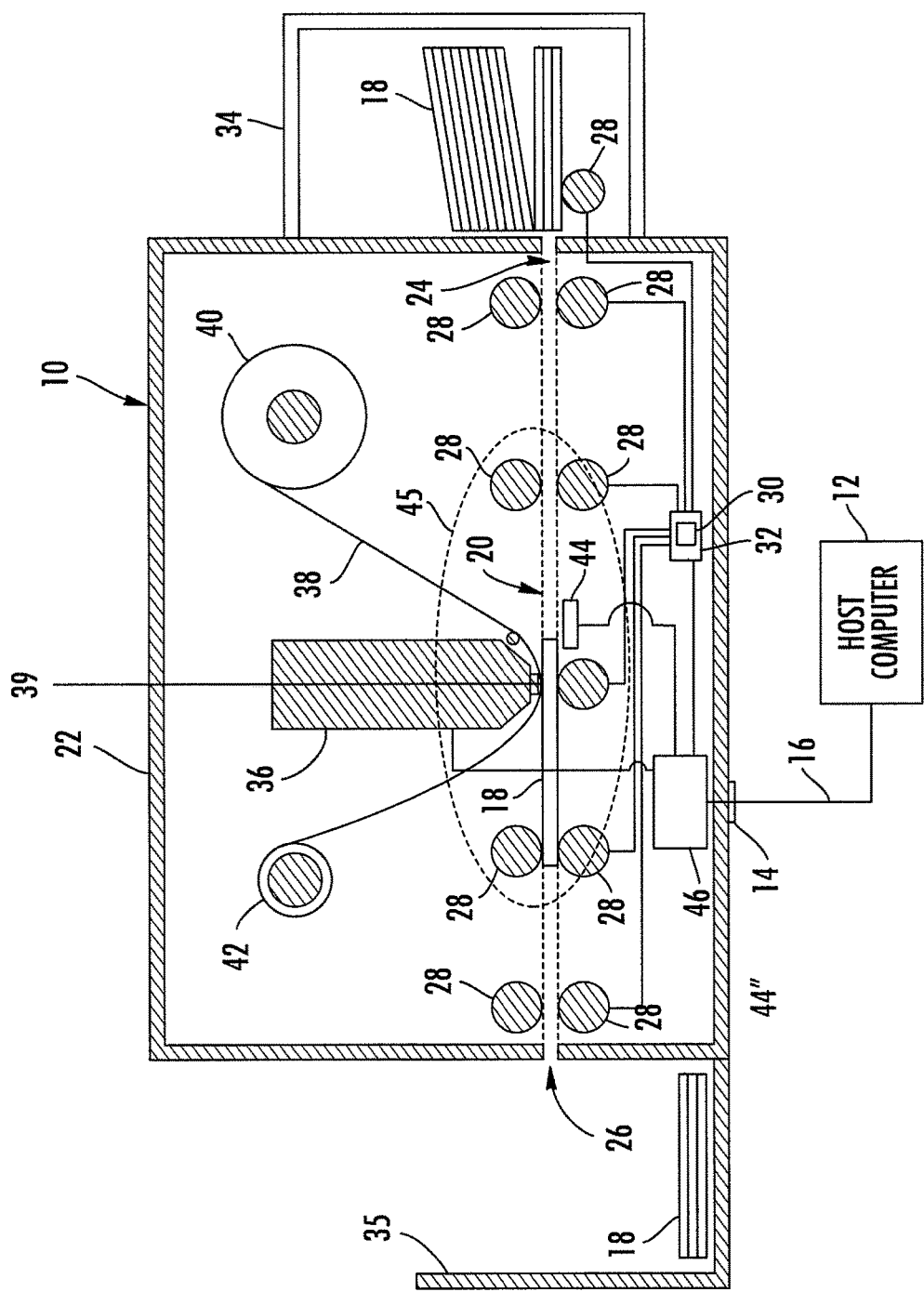
FIG. 6 is a section view schematically illustrating a printer according to another embodiment of the present invention.

In one embodiment illustrated by FIG. 6, one or more electronic communication devices 44 are positioned proximate to the print head's printline 39. The printline 39 is the area where the print head 36 prints indicia onto the card 18 or other media. In the illustrated embodiment, an electronic communication device 44 is positioned close enough to the printline 39 so that the electronic communication device 44 is capable of communicating with the media before or at the same time that the print head 36 is printing on the media. By performing the communication operation before or simultaneously with the printing operation, the throughput of the printer may be increased.

In one embodiment of the present invention, the communication device 44 is placed directly opposite the print head 36. However, in some embodiments it is not necessary for the communication device 44 to be placed directly opposite the print head 36 in order for the printer 10 to allow for before or simultaneous printing and reading/writing operations. For example, as illustrated in FIG. 6, where the communication device 44 is a contactless device, such as an RF coupler, the communication device 44 may create a communication field 45 that extends beyond the immediate proximity of the communication device 44. Preferably, the communication device 44 is configured so that it can communicate with a card 18 disposed within a communication field 45 that has an approximate diameter of two times the card length (i.e., one card length on each side of the print line 39).

As described above, the printer 10 may move the card 18 back and forth under the print head 36 and along the conveyance path 20 in order to print different colors on various areas of the card 18. Furthermore, different cards may have the contactless device, such as an RFID tag, located at different places on the card 18. A communication field 45 that covers an area of the conveyance path 20 approximating two card lengths (i.e., an area from about one card length before the printline 39 to about one card length beyond the printline 39) would generally allow the communication device 44 to communicate with an RFID tag (or other contactless data storage device) supported by the card 18 regardless of where the tag was placed on the card 18 and regardless of where the printer 10 moves the card 18 beneath the printline 39 during printing operations.

In another embodiment, it may also be preferred that the communication field 45 does not extend much beyond a card length on either side of the print line as a communication field 45 that is too large risks mistaken communication with upstream and downstream cards (e.g., the cards located in the input hopper 34 or the output hopper 35). In one exemplary embodiment, the card 18 has dimensions of two inches by four inches and the communication field 45 has dimensions of approximately four inches by six inches. In another embodiment, card(s) that are awaiting subsequent printing/reading/writing may be staged or held approximately four inches upstream of the communication field 45. Similarly, card(s) that have recently been printed/read/written may be staged or held approximately four inches downstream of the communication field 45.

Figure 7:
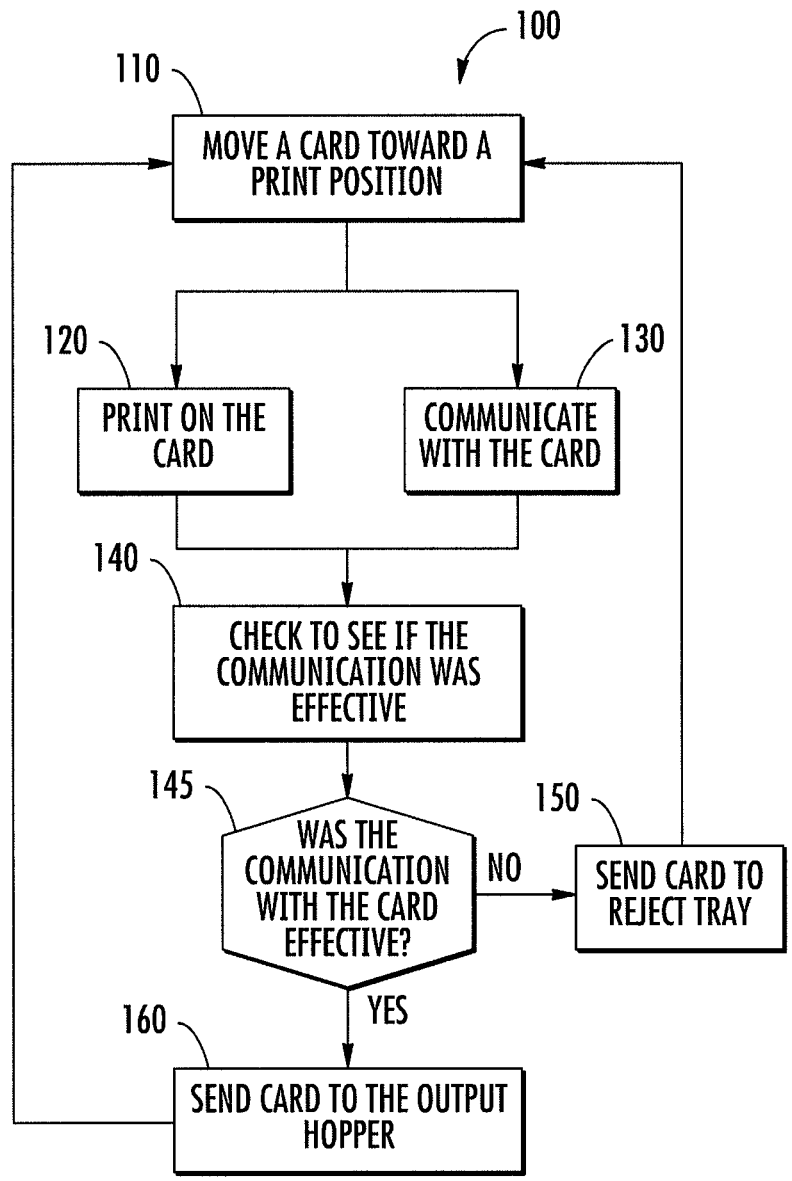
FIG. 7 is a block diagram illustrating a process of simultaneously communicating with and printing to a card or other media and validating the printed or communicated information according to one embodiment of the invention.

FIG. 7 is a flow chart 100 illustrating various steps that a printer 10 structured according to various embodiments of the present invention may perform when simultaneously communicating with and printing to a card 18 or other media. As represented by block 110, the printer 10 moves the card 18 from the input hopper 34 along the conveyance path and toward a print position. As soon as the contactless device on the card 18 enters the communication field 45, the at least one of the contactless communication devices 44 may begin wirelessly communicating with (e.g., encoding, writing to, or reading from, etc.) the card 18, as represented by block 130. This communication may continue as the card 18 is printed, as represented by block 120. Once the card communication 130 and printing 120 steps are completed, the card 18 can be sent along the conveyance path 20 to exit 26 and deposited into the output hopper 35.

In one embodiment, the printer is configured to confirm whether the card communication step 130 (e.g., whether the card was properly encoded, etc.) and printing steps 120 were effective, as represented by block 140. If the printer determines that such steps were effective, the card 18 can then be sent to the output hopper 35. If the printer determines that these steps were not effective, then the card 18 may be sent to the reject tray 37, assuming that the selected printer model is equipped with a reject tray, as represented by block 150. In other embodiments, the printer may use other methods or devices (e.g., error messages, etc.) to notify a user that the printing and/or communication steps were ineffective for a given card 18. The printer may also employ other methods or devices to distinguish between cards in which the printing and communication steps properly occurred and cards in which such steps did not properly occur.

In other embodiments, the printer 10 may use a communication device 44 to check whether a card has undergone effective printing and communication processes. For example, a communication device 44 may be configured to read data from an encoded RFID tag or a printed barcode on the card 18 and compare such data to data that was expected to be associated with the card 18. Such verification steps may occur at any position along the conveyance path. In one embodiment, the printer 10 is configured to use the same communication device 44 referenced above for communicating with the card at block 130 to check the effectiveness of such communication at block 140. Although FIG. 7 depicts the verification steps 140, 145 as occurring after the printing step 120, in another embodiment, the printer may be structured to perform such verification during printing operations.

Figure 8:
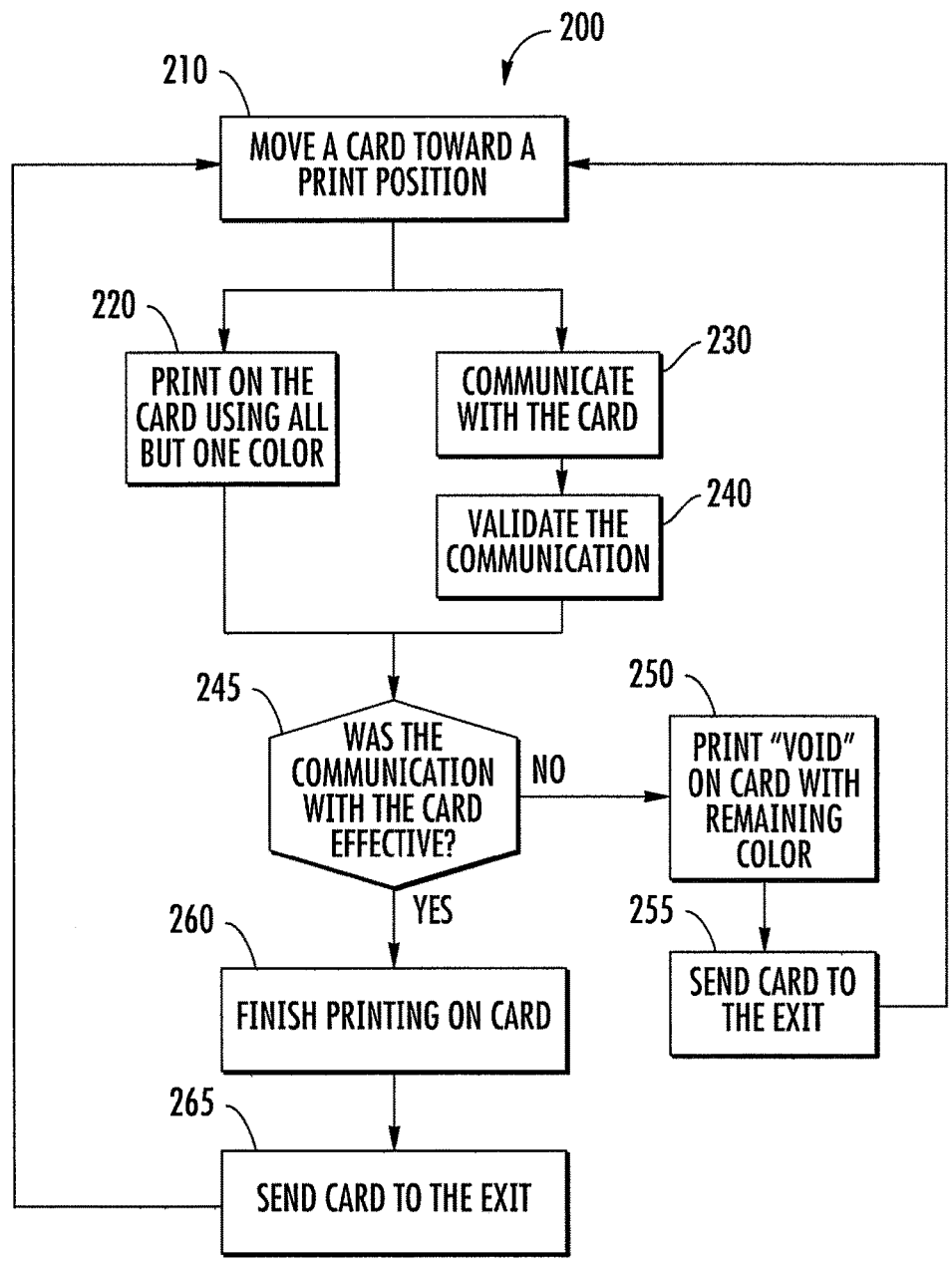
FIG. 8 is a block diagram illustrating a different process of communicating with and printing to a card and validating the printed or communicated information according to one embodiment of the present invention.

FIG. 8 illustrates a second process 200 whereby the printer 10 simultaneously prints and communicates with a card 18 or other media, according to another embodiment of the invention. As represented by block 210, the printer 10 moves a card 18 from the input hopper 34 along the conveyance path and toward a print position or region. Once the contactless device on the card 18 enters the communication field 45, the contactless communication device 44 may begin communicating with the card 18, as represented by block 230. Such communication may continue as the printer 10 prints the card 18, as represented by block 220.

As described above, card printers generally print in multiple passes for each of at least three colors (e.g., yellow, cyan, and magenta). However, in the process illustrated by FIG. 8, before the print assembly begins the last color pass (which is usually a dark color) the printer checks whether the communication step 230 (e.g., encoding, reading, etc.) was effective, as represented by blocks 240 and 245. As described above with respect to FIG. 7, such a validation operation may be performed as the printer is printing the first color passes or after the printer has completed the first color passes. If the printer finishes printing before the communication and validation steps are complete, the printer will pause before printing the last color and wait for the validation step to indicate that the communication step was effective. If the printer determines that the communication step was effective, the printer finishes printing the card, as illustrated by block 260, and then transmits the card 18 along the conveyance path 20 to the exit 26 where the card 18 is deposited into an output hopper 35. However, if the printer determines through the validation step that the communication step was ineffective, the printer will use the last (usually dark) color pass to print "void" or some other reject indicia, on the card 18, as represented by block 250. The printer 10 will then transmit the "voided" card to an exit of the printer, which may be an output hopper 35 or, in some embodiments, a reject tray 37.

Figure 9:
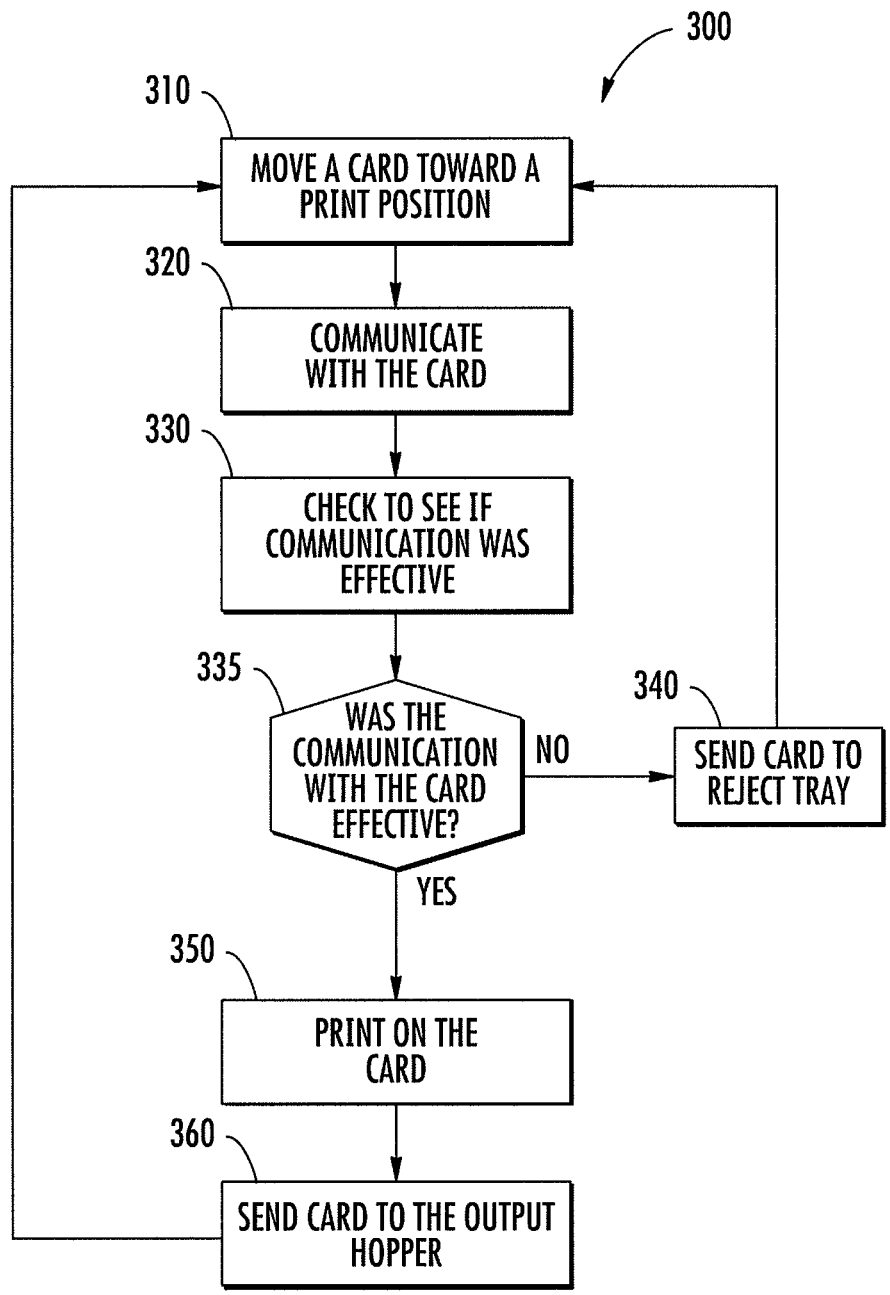
FIG. 9 is a block diagram illustrating yet another process of communicating with and printing to a card and validating the printed or communicated information according to one embodiment of the present invention.

FIG. 9 illustrates a third process 300 whereby the printer 10 communicates with the card 18 prior to printing in accordance with another embodiment of the invention. As represented by block 310, the printer 10 moves a card 18 from the input hopper 34 along the conveyance path into the communication field 45. As soon as the contactless storage device on the card 18 enters the communication field 45, the contactless communication device 44 may begin communicating with the card 18, as represented by block 320. After this communication step, the printer confirms whether the communication step was effective, as represented by blocks 330 and 335. As described above with respect to FIG. 7, such a validation process may be performed by the communication device 44 that was responsible for the communication step or by another communication device.

If the printer determines that the communication step was effective, the printer prints the card, as illustrated by block 350, and then sends the card 18 to the exit 26 of the printer, which may include an output hopper 35, as illustrated by block 360. However, if the printer determines that the communication step was ineffective, the printer 10 may not print the card 18 and could instead send the card 18 directly to an exit of the printer, which in some embodiments could include a reject tray 37. If the printer does not have a reject tray 37, the printer could send the rejected card 18 to the output hopper 35 leaving a user to interpret that card's lack of printed indicia as an indication that the communication step was ineffective. In another embodiment, as noted above, the printer may print "void" or other appropriate indicia to the card indicating that the card was rejected.

A printer configured to operate as illustrated in FIG. 9 can save ink (and relatively expensive print ribbon) as compared to printers configured to simultaneously print and communicate with cards. For example, when the printing and communication steps are performed simultaneously, cards that are rejected for failure of the communication step are still printed and any ink or ribbon used is wasted. Alternatively, the process illustrated by FIG. 9 allows the communication and validation steps to occur before printing. Therefore, rejected cards may be diverted before printing, while cards undergoing an effective communication step may proceed normally to the printing step.

In embodiments whereby the printer is configured to perform communication and validation steps before printing, the communication device 44 may be physically located upstream from the printline 39 so that a card 18 moving along the conveyance path 20 from the entrance 24 to the exit 26 encounters the communication device 44 prior to the printline 39. In another embodiment, the communication device 44 may be located proximate the printline 39, as described above with respect to FIG. 6. In such embodiments, the printer controller may be logically configured to perform the communication and validation steps prior to beginning print operations. Alternatively, the printer controller may be logically configured, perhaps through the host, to prompt a user to select whether the printer 10 should operate in (1) a high-throughput mode, where the printing and communication/validation steps are conducted simultaneously (e.g., FIG. 7), or (2) an ink-saving mode, where the communication and validation steps are conducted prior to printing operations (e.g., FIG. 9). The host 12 may provide the printer controller with the user's selection or in other embodiments this selection may be provided through a user input device associated with the printer. In other embodiments, the printer may be configured to perform the communication step (e.g., encoding and/or validating the card) without stopping the movement of the card through the printer, which increasing the output of the printer regardless on whether the printing operation occurs simultaneously or after such operations.

Although the above Figures and the descriptions describe printer configurations whereby the printing and the contactless communication steps can be conducted simultaneously, other types of communication may also be conducted simultaneously according to embodiments of the present invention. For example, if a card 18 has a contact electronic storage device and a contactless electronic storage device, the printer 10 may be configured such that the contact communication device is located within the communication field 45 of a contactless communication device. In this way, the printer can simultaneously communicate with any contact and contactless storage devices supported by the card 18.

Figure 10:
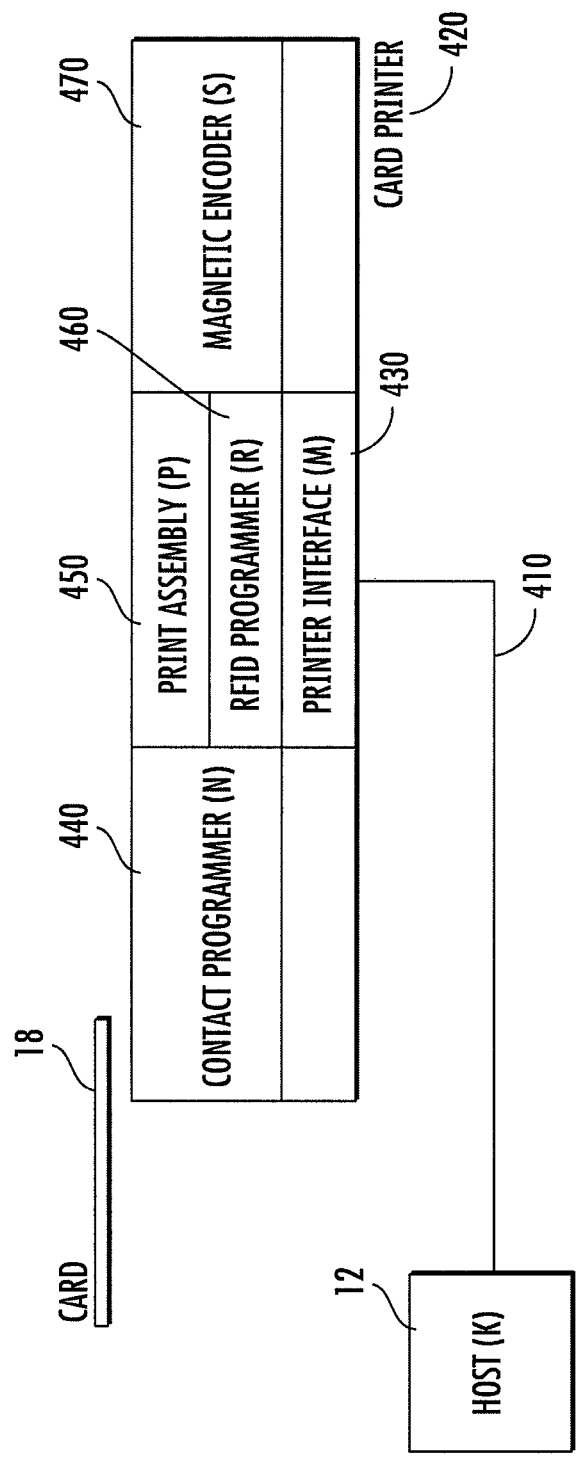
FIG. 10 is a block diagram schematically illustrating the printer having a an integrated interface and configured to print a card and communicate with a card in parallel according to one embodiment of the present invention.

Therefore, as described above, in one embodiment the printer 10 can be configured so that at least one communication step is conducted by the printer 10 in parallel with at least one other communication or printing step. As also described above, according to one embodiment, the printer 10 may be configured to have a single interface with a host device 12. FIG. 10 illustrates a particular embodiment of the present invention whereby a printer 420 is configured to include a single interface 430 with a host device 12 and is also configured to perform a communication step in parallel with at least one printing or second communication step. In particular, the embodiment illustrated by FIG. 10 shows an RFID encoding operation conducted in parallel with a printing operation as described in greater detail below.

Referring to FIG. 10, host 12 communicates with the printer 420 through communication interface 410 and printer interface 430. As described above, the printer interface 430 is a single integrated I/O interface for allowing communication between the host 12 and the various print devices and communication devices that may be present in the printer 420. The communication interface 410 may comprise a single wire or data communication cable. In one embodiment, the communication interface 410 is wireless and permits wireless communication between the host 12 and the printer interface 430 using wireless transmitter/receiver devices that will be apparent to one of ordinary skill in the art in view of this disclosure.

In one embodiment, the host 12 communicates to the printer 420 through the printer interface 430 to instruct the printer 420 to move the card 18 into proper position for a contact programmer 440 to program or otherwise communicate with a contact electronic storage device supported by the card or other media. The host 12 communicates with the contact programmer 440 via the printer interface 430 and instructs the contact programmer 440 to program the card with the data provided by the host 12 (the data also being provided via the printer interface 430).

The printer 420 may then move the card 18 into position for simultaneous printing by the print assembly 450 and communication by the RFID programmer 460. The information that is printed to the card 18 and the information that is written to or read from the RFID tag (or other data storage device) on the card 18 may be derived from data received from the host 12 via the integrated printer interface 430.

The printer may then move the card 18 into position for magnetic communication by the magnetic encoder 470. The information written to a magnetic strip on the card 18 may be derived from data provided to the magnetic encoder 470 from the host 12 via the integrated printer interface 430. Finally, the completed card 18 or other media may be ejected by the printer 420.

Throughout the process, the printer 420 and/or the individual components of the printer 420 may communicate back to the host 12 via the printer interface 430 and the communication interface 410 in order to provide feedback related to the printing or communication processes.

Post-Encoding Validation of Smart Card Data

As described in some detail above in relation to FIGS. 7-9, various embodiments of the present invention provide a process whereby data written to or otherwise included on a card or in a data storage device supported by a smart card or other media is validated. For example, after the print head prints data to a card or after a communication device 44 communicates data to or from a card or other media (e.g., after a communication device 44 encodes a card 18 with data) the printer may check the data in order to determine whether the data was effectively printed and/or communicated. The communication device 44 may be configured to validate the printed or communicated data immediately after the printer or the communication device 44 prints to or communicates with the card 18. For example, where the communication device 44 is an RFID transceiver, the RFID communication device 44 may be configured to encode data to the card 18 when the card 18 is in the communication field 45. In one embodiment, after the RFID communication device 44 encodes data to the RFID tag on the card 18 and before the card 18 leaves the communication field 45, the same RFID communication device 44 reads the encoded data from the card's RFID tag and compares it to stored data that was intended for encoding. If the read data matches the data that was supposed to be encoded, the printer 10 permits the card 18 to proceed to the next station in the printer 10 (e.g., send the card to the output hopper 35 if there are no other stations). The printer 10 may also communicate a signal to the host 12 indicating that the print/communication step was effective or that a card 18 was effectively printed or communicated with. If the read data does not match the data that was supposed to be encoded, the printer may reject the card. In one embodiment, if the data has not been communicated effectively, the printer instructs the communication device to try to communicate with the card again, if such is possible. In some embodiments, the printer sends the rejected card to a reject tray 37 and/or prints "void" or some other rejection indication on the card 18, as described above. If a card 18 is rejected, the printer 10 may send a signal to the host device 12 indicating that a card 18 was rejected and/or may send data pertaining to why the card was rejected. Alternatively, in one embodiment, the printer may simply not communicate anything to the host device and may try to print on and communicate with the next card in place of the rejected card. If the next card also is not printed or communicated with effectively, the printer may then send an error signal to the host 12.

Authentication of Media and Automatic Printer Configuration

In one embodiment, the printer 10 may include a system for authenticating a consumable and/or a system for automatically configuring the printer 10. The authentication system may be used to determine whether a printer consumable, such as a resin thermal transfer ribbon or a roll of smart media, is an "allowed" consumable that is supported by the printer 10. Similar descriptions of such authentication systems are further disclosed in U.S. Patent Application No. 2006/0191022, which is assigned to the assignee of the present application and is hereby incorporated by reference in its entirety.

In one embodiment, a RFID transponder (also referred to as a RFID "tag") is provided on or otherwise associated with a printer consumable. Although an RFID transponder is described, the transponder need not be limited to radio frequency signals, and may utilize any form of suitable electromagnetic radiation, such as visible, ultraviolet and infra-red light, as is known in the art. In one embodiment, the RFID transponder contains a unique, factory-programmed serial number. Certain commercially available RFID transponders each contain a unique 32 to 64-bit transponder serial identification number used in the "anti-collision" protocol. This protocol enables separation and unique identification of several transponders simultaneously appearing in the field of the RFID reader, which may be caused by multiple host devices being located in relatively close proximity.

In one embodiment, an authentication number is calculated from the unique serial number using an encryption function selected by and confidential to the manufacturer of the printer consumable. The authentication number is permanently stored on the RFID transponder. The encryption function is made available to the printer 10 and/or host 12 during operation thereof. For example, in one embodiment, the confidential encryption function can be programmed into the printer 10 during manufacture. In another embodiment, the confidential encryption function is made available to the host 12 over a network. When the printer consumable is loaded into the printer 10, an RF transceiver in the printer reads the values of the serial number and the authentication number from the RFID transponder attached to or on the consumable. It then determines whether the authentication number matches the serial number as transformed by the confidential encryption function. If the values agree, then the ribbon cartridge consumable article is deemed to be an authentic media product that is useable on that printer.

Similarly, an RFID transponder on the media can be used to automatically configure some aspect of the printer 10 or to send data pertaining to the media to the host 12. For example, if a web of smart labels intended for printing and encoding is loaded into the printer, a transponder on the roll of smart labels may indicate to the printer 10 and/or to the host 12 information related to the media, such as the type of label, the type of electronic media attached to the label, the size of the labels, the number of labels on the roll, the distance between the labels on the web, etc. The printer 10 may use such information to automatically configure itself to print and/or communicate with the media. Such information may be stored as data on the RFID transponder or may be communicated indirectly through a serial number unique to the type of media roll. The printer 10 and/or the host 12 may be configured to recognize this serial number and, thus, access files related to the media that are stored within or otherwise available to the printer 10 or host 12.

In one embodiment, the transponder for authenticating the consumable and/or for configuring the printer is located on a portion of the consumable packaging. In other embodiments, the transponder is located on the consumable itself. For example, in one embodiment, where the consumable is, for example, a roll of ink ribbon or a roll of labels, the transponder may be attached to the core of the roll. In such an embodiment, the transceiver for reading the transponder may be located in the spindle that holds the core of the roll in the printer.

In another embodiment, where the consumable is, for example, a roll of smart labels or a stack of smart cards, the information for authenticating the media and/or configuring the printer may be stored in the transponder memory of one of more of the smart labels or cards. This transponder memory may be that which is intended to receive additional information (e.g., through encoding) from the printer or the smart media may comprise two or more transponders, with one transponder memory dedicated to carrying authentication data and/or printer set-up or configuration information.

In another embodiment, only the first label on a roll of labels or the first card in a stack of cards 18 may contain a transponder (or other data storage device) having authentication data and/or printer set-up or configuration information stored therein. In such an embodiment, the communication device 44 used to encode or otherwise communicate with a transponder (or other storage device) associated with the media may also be used to read the authentication, printer set-up, or configuration data stored in one or more of the transponders. Such embodiments may require only one communication device 44 for reading authentication, set-up, or configuration data from a transponder and for writing data to such a device. As described above, a printer may also be structured so that the same communication device is also used for verifying effective communication between the printer and the transponder or other data storage device.

In another embodiment, the printer 10 may include a separate communication device 44 that is dedicated exclusively to reading authentication, set-up or configuration information from the transponder or other data storage device. Such a communication device 44 may be located along the conveyance path 20 generally before a print position.

Contactless communication devices (whether for authentication, printer set-up retrieval or otherwise) structured in accordance with various embodiments of the present invention may use UHF RFID transceivers and transponders or HF RFID transceivers and transponders. Other wireless communication devices may also be used as noted above.

Antenna-Coupler for UHF RFID Communication Devices

As described above, in some embodiments one or more of the communication devices 44 may comprise an RFID transceiver for communicating with RFID transponders supported by smart cards 18 or other media. In various embodiments, the RFID transceiver may be configured to generate and transmit RF communication signals via an antenna-coupler, for example a UHF antenna-coupler 1000, (shown in FIG. 11) that is located proximate the conveyance path 20, for example as illustrated in FIG. 6. For purposes of the present specification, the transceiver and the antenna-coupler 1000 may be referred to collectively as forming at least part of an RFID communication device 44. As will be explained in more detail below, the RFID communication device 44 transmits an electromagnetic signal for establishing, at predetermined transceiver power levels, a mutual coupling between the transceiver and a targeted transponder of a media unit (e.g., a card 18) located in the communication field, such that data may be read from and written to the transponder.

In general, the transceiver is a device configured to generate, transmit, process, and receive electrical communication signals and generally share the same hardware for transmitting and receiving purposes. It is understood that similar devices such as readers, transmitters, receivers, or transmitter-receivers may be used within this invention. "Transceiver" as used in the present application refers to the devices noted above and to any device capable of generating, processing, or receiving electrical and/or electromagnetic signals.

In general, the antenna-coupler receives and transmits electro-magnetic fields based on the electrical signals generated by the transceiver or the transponder. To transmit signals, the antenna-coupler converts the electrical signals generated by the transceiver or the transponder to electromagnetic signals and, to receive signals, the antenna-coupler converts electromagnetic signals to electrical signals. The electromagnetic fields serve to couple the transceiver and the transponder. Moreover in the case of a passive transponder, the electromagnetic fields of the antenna-coupler energizes the transponder and thereby prompts the transponder to respond to the transceiver by re-radiating the received signal back and modulating the fields in a well-known technique called backscattering. In the case of an active transponder, the transponder may respond to the electro-magnetic fields by transmitting an independently powered reply signal to the transceiver through the coupler.

Problems can occur when communicating with multiple adjacent transponders regardless on whether the transponders are passively or actively powered. For example, the electro-magnetic fields propagating from the coupler, also referred to as an interrogating electro-magnetic signal, may activate more than one transponder at a given time. This simultaneous activation of multiple transponders may lead to collision or communication (i.e. read and write) errors because each of the multiple transponders may transmit reply signals to the transceiver at the same time.

The printer 10 may employ an RF-shielded housing or anechoic chamber for shielding the adjacent and non-targeted transponders from the electromagnetic field. In various embodiments, transponders individually pass through a shielded housing that defines a transponder encoding region for individualized exposure to an interrogating electromagnetic field.

However, in other embodiments the antenna-coupler may be adapted to have a controlled transmission range that can be limited to minimize the inadvertent activation of transponders outside a transponder encoding region. As such, the antenna-coupler may operate with little to no anti-collision management techniques or shielding components. The structure and shape of the antenna-coupler may vary and, in one embodiment, the antenna-coupler is generally configured to propagate an electromagnetic signal having a weak far field component and a strong near field component, wherein the far field component is too weak to activate or communicate with any of the transponders and the near field component is concentrated mostly in the transponder encoding region such that it only activates or communicates with the transponders in the transponder encoding region.

Examples of such antenna-couplers are further disclosed in U.S. Patent Application Publication Nos. 2005/0045723 and 2005/0045724, and U.S. application Ser. Nos. 11/263,093 and 11/371,785, each of which is assigned to the assignee of the present application, and the contents of each of which is hereby incorporated by reference in its entirety.

Figure 11B:
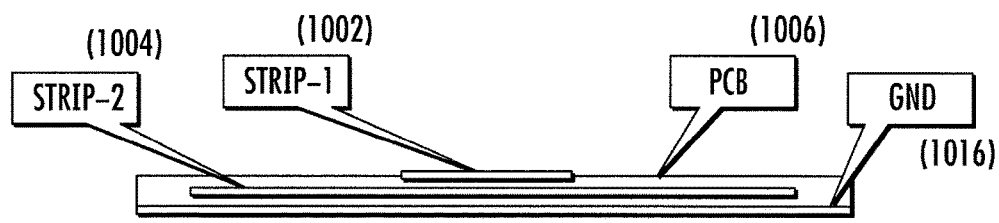

FIGS. 11a and 11b illustrate yet another antenna-coupler 1000 employable within embodiments of the present invention. According to the embodiment illustrated in FIGS. 11a and 11b, the antenna-coupler 1000 includes a first microstrip 1002 and a second microstrip 1004. The microstrip 1002, 1004 are generally orthogonal to each other and generally centered relative to one another forming a cross-like shape. More specifically, as used herein "cross-like shape" defines a spatial relationship between the two microstrips 1002, 1004 in which the first microstrip 1002 traverses the second microstrip 1004. The angle and point at which the first microstrip 1002 traverses the second microstrip 1004 may vary. In the illustrated embodiments, the first microstrip 1002 traverses the second microstrip 1004 at approximately ninety degrees and at approximately the center of the second microstrip 1004. Moreover, in the illustrated embodiments, approximately the center of the first microstrip 1002 traverses the second microstrip 1004. In other embodiments, the angle of traverse may vary between forty-five degrees and one hundred and thirty five degrees. And any point of the first microstrip 1002 between a first end and a second end of the first microstrip 1002 may traverse the second microstrip 1004 at any point between the first and second ends of the second microstrip 1004. Also, according to the embodiment of FIGS. 11a and 11b, the microstrips 1002, 1004 are disposed on separate but parallel planes and separated from one another by a substrate material 1006.

The first microstrip 1002 extends from a first end to a second end and defines a length. The first end is connected to a first port 1008 (also referred to herein as port-1) of the antenna-coupler and the second end is terminated by a first resistive load 1010. Similarly, the second microstrip 1004 extends from a first end to a second end and defines a length. The first end is connected to a second port 1012 (also referred to herein as port-2) of the antenna-coupler and the second end is terminated by a second resistive load 1014. Each of the resistive loads 1010, 1014 is connected to a ground layer 1016 that is generally parallel to the microstrips 1002, 1004 and spaced apart from the microstrip 1002, 1004 by the substrate material 1006.

In order to increase the energy transfer efficiency between the antenna-coupler 1000 and a transponder, the resistive load 1010, 1014 for each microstrip may be higher than the characteristic impedance defined by each of the microstrips 1002, 1004. This may in turn generate a standing wave and increase the electrical field strength along each of the microstrips 1002, 1004. Also, in order to avoid an impedance mismatch between the microstrips 1002, 1004 and the transceiver, the length of each of the microstrips 1002, 1004 may be substantially equal to a multiple of one half the wavelength of the operational frequency (i.e., the length may substantially equal $N*\lambda/2$, wherein N may equal 1, 2, 3, 4, 5, . . . ). In other words, by setting the length of a microstrip to a multiple of one half the wavelength of the operational frequency, the load impedance of the antenna-coupler is substantially matched to the port impedance regardless of the characteristic impedance of the microstrip.

In general, the lower the characteristic impedance of the microstrips 1002, 1004, the wider the microstrips 1002, 1004 and the narrower the bandwidth of the antenna-coupler 1000. To enlarge the bandwidth and decrease the length (i.e., the distance from the first end to the second end) of the microstrips 1002, 1004, a non-uniform or a varying width profile for the microstrips may be used, as further described in U.S. patent application Ser. No. 11/371,785, which is owned by the present assignee and is incorporated herein in its entirety. For example, according to the embodiment illustrated in FIGS. 11a and 11b, each of the microstrips 1002, 1004 may have a bow-tie profile. Other examples include exponential, Klopfenstein, triangular, Hecken, or other tapered profiles. Among other things, the tapered profiles allow for the miniaturization of the antenna-coupler. In addition to or instead of tapered profiles, the antenna-coupler may be further miniaturized by using a substrate material with a relatively high permittivity, for example, Rogers R3006: $\varepsilon=6$, or R3010: $\varepsilon=10$, or other material substrates with $\varepsilon>20$.

The transponder in the smart card may have various orientations relative to the feed direction such as landscape, as shown in FIGS. 12a, c, e, and g, and portrait, as shown in FIGS. 12b, d, f, and h. A landscape orientation is generally when the length of the transponder is parallel to the media or card feed direction. A portrait is generally when the length of the transponder is perpendicular to the feed direction.

In addition to the orientation between the transponder and the feed direction, the orientation of the transponder to the antenna-coupler may vary as the transponder moves across the antenna-coupler. For example, the transponder may move across the antenna-coupler such that the length of the transponder travels along the length of a conductive strip of the coupler in a parallel manner, referred to as "lateral movement." As another example, the transponder may move across the antenna-coupler such that the length of the transponder travels across the length of the conductive strip at a generally perpendicular angle in a parallel manner, referred to as a "cross-wise movement."

Many transponders include a dipole antenna structure, referred to as a dipole type transponder. In some embodiments, for optimum coupling with a dipole type transponder, the antenna-coupler should be arranged for a mutual lateral movement, i.e. the opposite ends of the dipole should be exposed to a phase differential as the dipole passes through the electro-magnetic fields.

The two microstrips conductors 1002, 1004 forming a general cross-shape allows for the antenna-coupler 1000 to accommodate various transponder orientations to the feed direction and transponder orientations to the antenna-coupler as illustrate in FIGS. 13a and 13b. For example, both microstrips can be fed by the transceiver's signal in phase simultaneously and one port at a time can be activated by a switch depending on the transponder orientation to the antenna-coupler such as lateral movement or cross-wise movement. As another example, for transponder orientations to the antenna-coupler between the lateral and cross-wise movements, port-1 and port-2 can be fed using a phase shifter depending on the orientation of the transponder such that the two microstrips create a phase differential between the two microstrips for coupling with the transponder. As yet another example and as illustrated in FIGS. 16a, 16b, 17a, and 17b, both of the microstrips 2002, 2004 may be activated simultaneously through one port 2008. In other words, both microstrips may be receiving or directing an electrical signal from or to the transceiver.

Referring again to the embodiment in FIGS. 16a, 16b, 17a, and 17b, rather than the two microstrips being in separate and parallel planes as discussed above, the two microstrips 2002, 2004 may be substantially co-planar. As illustrated, one of the microstrips 2002 may include a bridge 2020 to avoid the two microstrips 2002, 2004 from physically intersecting at the center. For example, the first microstrip 2002 may have two sections 2012, 2014. The first section 2012 may extend from the first end of the first microstrip 2002 to approximately the second microstrip 2004. The second section 2014 may extend from approximately the second microstrip 2004 to the second end of the first microstrip 2008. The two sections 2012, 2014 may be linked through a bridge 2020 that extends around the second microstrip 2004 such that the first and second microstrips 2002, 2004 do not intersect (i.e., the first and second microstrips 2002, 2004 do not have a common point) even though the two microstrips 2002, 2004 are in a cross-like configuration. The bridge 2020 may include a jumper wire and/or one or more traces. Also, as mentioned above, in this embodiment, the antenna-coupler 2000 may have one port that leads to both the first and second microstrip such that both the first and second microstrips may be activated simultaneously or concurrently. Each of the microstrips 2002, 2004 may be terminated by a resistive load 2010, 2018 and be spaced apart from a ground plane 2016 separated by a substrate 2006.

The antenna-coupler herein is described in context with a printer-encoder configured to process UHF RFID smart cards. However, the application of the antenna-coupler described herein is not limited to printer-encoder for UHF RFID smart cards and may be applied to other RFID enabled encoders or systems that may benefit from the ability to selectively communicate with a randomly oriented targeted transponder disposed among multiple adjacent transponders.

XML Communication Between the Host and the Printer

In one embodiment of the present invention, the printer 10 is configured to print and/or encode the media based on an extensible markup language (XML) input data stream. In one embodiment, the printer 10 is configured to communicate with the host 12 using XML. Examples of printer systems configured with XML systems are further disclosed in U.S. Patent Application Publication Nos. 2006/0138227, 2005/0150953, 2004/0149826, 2004/0094632 and 2003/0136841, each of which is assigned to the assignee of the present application, and the contents of each of which is hereby incorporated by reference in its entirety.

FIG. 14 illustrates a specific embodiment of a high-level system block diagram. The system illustrated in the figure and described below may be executed by the processor of the host 12. Again, the processor of the host 12 may perform functions common to both the host computer 12 and the printer 10. There may be one or more processors, which may function in concert or which may function separately. It is not material to the scope of this invention whether the processing or processing functions are performed by or in the host 12 or by or in the printer 10.

The XML system includes an XML processor 1170 (also referred to as the "XML parser"), an XSLT 1174 (extensible stylesheet language transformation) processor, an XSLFO 1178 (extensible stylesheet language formatting object) processor, a bit map/barcode/RFID rendering engine 1180, an RFID transceiver 1161, and the printer driver 1154. Note that although the figure and the following description describe the XML system with relation to printing a barcode or encoding an RFID transponder, the same system can be used for encoding other types of storage devices and for printing other human-readable or machine-readable indicia.

Also note that the printer driver 1154 is an example of a component whose function may be performed by either the processing device in the computer system 12 or the processing device in the printer system 10, depending upon the physical location of the associated processing device. A single processing device, if sufficiently powerful, may handle all functions for the XML system.

An XML schema repository 1182 (schema repository) may provide input to the XML processor 1170 while an XSLT stylesheet repository 1184 (stylesheet repository) may provide input to the XSLT processor 1174. The system may also include an enterprise resource planning (ERP) system 1188, which may be, for example, a warehouse management system that transmits an XML input data stream 1144 to the XML processor 1170. The ERP system 1188 may initiate the request to print the barcode label or encode the RFID data into the RFID transponder 1162, and may provide the XML data that forms the bar code, RFID encoded data, and other variable label or element fields to be printed or encoded. Such variable label fields may include, for example, any or all of the human-readable text and/or characters printed on the label.

When referring to the XML data, two basic types shall be referred to herein, namely, the XML value data and the XML element name. The XML value data is the changeable data or the data that is desired to be printed on the barcode label or encoded into the RFID transponder, such as the data "1122 Green Street," which may be part of the XML value data corresponding to, for example, a shipping address. The XML element names are part of the XML language semantics where an arbitrary label or element name may be selected to represent the XML value data, the use of which is defined by the XML language. Typically, the element names appear between angled bracket ("<element name>").

Known barcode label and other automatic identification systems often use proprietary software encoding schemes. Additionally, such schemes are often prone to errors, and the underlying value data is usually unreadable by a non-technical individual. In known systems, if an error exists in the underlying value data sent from the enterprise system, or if the data is missing or otherwise incorrect, the barcode system will print or encode what it is instructed to do, which of course, produces an error in the barcode label or RFID transponder, rendering it inaccurate or useless.

Moreover, when dealing with compliance labeling, known systems require non-trivial changes in the data encoding when the form or content of the label changes in accordance with the compliance label demands. Such changes in the form or content of the barcode or RFID transponder, again, are susceptible to errors. Business relationships may also be damaged by continued problems in the barcode labeling system or the RFID encoding system.

Embodiments of the present XML system utilize an open format. In particular, the formatting requirements and the form of the barcode label or RFID transceiver are all defined in the XML language. Moreover, not only is XML well defined and available for all to use, but non-programmers can understand the data and commands in an XML data stream or file (or hard copy) with minimal training.

Various XML system components are commercially available. Several different commercially available XML processors 1170 may be used interchangeably or with little modification. For example, the following commercially available XML processors may be used: "XML for C++" available from IBM Corporation, "MSXML3" available from Microsoft Corporation, "Oracle XML Developers Kit for C" available from Oracle Corporation, "Expat" available from Thai Open Source Software Center, Ltd., or "Xerces-C++" available from the Apache Software Foundation. However, any suitable XML processor may be used.

Similarly, several different commercially available XSLT processors 1174 may be used interchangeably or with little modification. For example, the following XSLT processors may be used: "iXSLT" available from Infoteria Corporation, "MSXML3" available from Microsoft Corporation, and "Libxslt" available from Gnome. However, any suitable XSLT processor may be used.

Again, several different commercially available XSLFO processors 1178 may be used interchangeably or with little modification. For example, the following XSLFO processors may be used: "XEP" available from RenderX Corporation, "XSL Formatter" available from Antenna House Corporation, and "FOP" available from the Apache Software Foundation. However, any suitable XSLFO processor may be used.

The XML processor 1170 receives the XML input data stream 1144 from an external source. For example, as described above, the external source may be the ERP system 1188, such as the warehouse management system. The XML processor 1170 essentially parses and processes the XML input data stream 1144 and generates a set of nodes, which may be in a "tree" structure, as is known in the art. Each of the system processors acts on the nodes of the "tree" to perform their required function. The underlying value data contained in the XML input data stream from the ERP system is processed and entered into a "label values node tree," which holds the data.

The following is a brief overview of the operation of the various system components. First, note that the XML input data stream 1144 includes text that identifies the name and location of other required XML documents or files. One such document is referred to as "XML schema" or "schema" 1182. The schema 1182 is used to validate the XML input data stream 1144, including the underlying value data. If validation is successful, a stylesheet 1184 is applied, as will be described below. The name and location of the stylesheet 1184 is also specified in the XML input data stream 1144. Application of the stylesheet is handled by the XSLT processor 1174, which under the direction of the stylesheet 1184, may transform the underlying XML element names and/or underlying value data. Next, the data is processed by the XSLFO processor 1178, which handles formatting and "layout" of the underlying value data, which may include, for example, formatting the underlying value data in accordance with, for example, font type, font size, color, and the like. Next, the underlying value data is processed by the bitmap/barcode/RFID rendering engine 1180, which creates a bitmap of the barcode label or the programming code sequence for the RFID transponder corresponding to the transformed and formatted data. The rendering engine 1180 may utilize an "instream foreign object" residing in the stylesheet to direct creation of the bitmap. The bitmap is then sent to the printer driver 1154 for subsequent printing of the barcode label by the barcode printer or to the RFID transceiver 1161 for encoding into the RFID transponder 1162.

As described above, the schema 1182 functions to validate the entire input data stream, in particular, the underlying value data, where errors may be typically found. In practice, errors are often inadvertently introduced when changes are made to the form or content of the bar code label.

The name and location of the schema document 1182 is contained in the XML input data stream 1144, which XML input data stream corresponds to the request to print and/or encode a barcode label. The XML processor 1170 in conjunction with a schema validation module 1179 validates the underlying value data. The use of schema 1182 is cost effective because it prevents errors and omissions with respect to the final output, namely, the bar code label, or "shipping label," or RFID tag or transponder.

If the XML input data stream 1144 is rejected or flagged as having an error, an error message may be transmitted back to the source. This may flag or trigger human intervention to correct the error. For example, in one specific example, the source is an ERP system 1188. In this way, the data is initially checked prior to processing to insure that it complies with all required label and barcode rules.

This may be particularly beneficial when dealing with compliance labeling. In known systems, the compliance demander would merely notify the supplier as to the changes in the compliance labeling requirements. If the supplier then makes an error in interpreting or implementing these changes or instructions, the labels produced or RFID transponders encoded and applied to products shipped to the compliance demander may have errors, which could jeopardize future business or cause monetary fines to be applied.

In the present invention, the compliance demander preferably makes the changes directly to the schema 1182 and/or the XSLT stylesheet 1184. For example, if the physical layout of the label has been changed or if element names have been changed, the compliance demander will modify the XSLT stylesheet 1184. Similarly, if the underlying value data has been added or deleted or otherwise qualified (i.e., a new acceptable numerical range for a zip code), the compliance demander may modify the schema 1182. In this way, the supplier need only modify the output of its ERP system 1188 to ensure that it matches the modified XML input data stream 1144. If only the physical layout of the label has changed, the supplier does not need to make any modifications at all.

For example, the compliance demander may now require that a nine digit zip code be used rather than the original five digit zip code. Accordingly, the compliance demander may modify the schema 1182 to require both a first and second zip code field, and the second field will also be limited to numerical digits within a certain range, perhaps 0000-9999. The compliance demander may also modify the stylesheet 1184 to accommodate that change. In response thereto, the supplier must insert the added zip code field in its ERP system 1188 so that it appears in the XML input data stream 1144 sent to the XML system. If such modification of the XML input data stream 1144 is not performed correctly, the schema 1182 will cause an error to be reported back to the ERP system 1188, and the label will not be printed or the RFID transponder 1162 will not be encoded.

Thus, the supplier need only access the modified schema 1182 and/or stylesheet 1184 from the repository, which is automatically applied to the underlying value data when received. Essentially, minor changes, and significantly, major changes, to the form and content of the barcode label or RFID transponder are transparent to the supplier, and such changes to the content of the barcode label or RFID transponder are validated in accordance with the schema 1182. Accordingly, the supplier need not incur costs to change the form or content of the barcode label or RFID transponder dictated by the compliance demander, and cannot make any errors in implementing such changes.

The schema documents 1182 are preferably obtained from a XML schema repository. In one specific embodiment, the schema repository may be external to the XML system and the host 12, and may be accessed via the network, the Internet, or via any suitable network to which the host computer 12 is coupled. The schema repository may contain a plurality of schema documents. Thus, the XML input data streams 1144 representing the various requests to create a barcode label or RFID transponder may each specify the name and location of the corresponding schema 1182 in the repository. When the request is received by the XML processor 1170, the corresponding schema 1182 may be retrieved from the schema repository.

In another embodiment, the schema 1182 obtained from the schema repository via the network may be kept locally, and thus may temporarily reside in a memory subsystem of the host 12 or printer 10, such as a hard disk or a database. In this way, if the same schema 1182 is used for multiple XML input data streams 1144 or for subsequent barcode label or RFID tag requests, the XML processor 1170 need not retrieve the same schema 1182 externally via the network, but rather, may retrieve that schema 1182 from the memory subsystem, which may be more efficient. According to this embodiment, the compliance demander may change or modify the schema 1182 in an external repository at only certain times. For example, the compliance demander may change the schema 1182 only at 1:00 AM each day. Thus, the supplier need only update the schema 1182 from the repository into the memory subsystem only once per day, for example, after the compliance demander has performed the schema update. The supplier would then know that the schema saved temporarily in the memory subsystem is the most recent schema document, at least up until the time that the updating is scheduled to occur. Regardless of the location from where the schema 1182 is obtained, the schema validation module performs the checking and validation of the underlying data.

Of course, the stylesheet 1184 is also an XML document, and thus it is also processed by the XML processor 1174. Accordingly, the result of the processing of the stylesheet is an XSLT stylesheet node tree, which is the "memory representation" or working model of the stylesheet that was processed. The XSLT stylesheet node tree may be in the form of a "document object model" (DOM), as is known in the art. Further, the XSLT stylesheet node tree may reside in cache memory for efficiency. The XSLT processor operates on the data in the XSLT stylesheet node tree to perform its function of transforming the underlying value data or underlying element names in accordance with the stylesheet.

The XSLT processor 1174 may modify, reposition, and rearrange the underlying value data or may add to the underlying value data or delete some of the underlying value data. For example, under direction of the stylesheet 1184, the underlying value data may be rearranged into table format or into columns. In particular, the stylesheet 1184 may add XSLFO formatting elements and attributes.

After the underlying value data in the label value node tree has been processed in accordance with the corresponding stylesheet 1184, an XSLFO instance node tree is produced. Again, the XSLFO instance node tree may be in the form of a document object module, as is known in the art. The XSLFO instance node tree contains XSLFO commands (layout instructions) that directs the XSLFO processor 1178 with respect to formatting and layout. The XSLFO processor 1178 then interprets the XSLFO commands and applies such commands to the underlying value data so as to properly format and layout the underlying value data. The XSLFO processor 1178 produces the XSLFO area node tree, which represents the final output of formatting before rendering.

The XSLFO area node tree is then passed to the bitmap/barcode/RFID rendering block 1180 where it is interpreted to direct creation of the bitmap 1192 of the barcode label or the programming code sequence for the RFID transponder corresponding to the transformed and formatted data from the XML input data stream 1144. This bitmap or programming code sequence is then sent to either the printer driver 1154 or the RFID transceiver 1161 as the case may be.

Many modifications and other embodiments of the inventions set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An antenna-coupler for a system having a transceiver and being configured to process one or more smart media and associated transponders of the smart media, the antenna-coupler comprising:
    a first microstrip extending a first length from a first end to a first terminating point, wherein the first microstrip is terminated at the first terminating point by a first resistive load and the first microstrip is in communication with the transceiver for receiving and sending one or more electrical signals;
    a second microstrip extending a second length from a second end to a second terminating point, wherein the second microstrip is terminated at the second terminating point by a second resistive load and the second microstrip is in communication with the transceiver for receiving and sending one or more additional electrical signals;
    wherein the first microstrip and the second microstrip are generally orthogonal to each other forming a cross-like arrangement such that the first length of the first microstrip traverses the second length of the second microstrip;
    a ground plane spaced apart from the first and second microstrips; and
    at least one substrate extending at least partially between the ground plane and the first and second microstrips.

2. The antenna-coupler according to claim 1, wherein the first and second microstrips are spaced apart and separated by the at least one substrate.

3. The antenna-coupler according to claim 2, wherein the first and second microstrips are substantially co-planer and the first microstrip further includes a first section, a second section, and a bridge;
    wherein the first section extends from the first end of the first microstrip to approximately the second microstrip, the second section extends from approximately the second microstrip to a second end of the first microstrip, and the first and second sections are linked through the bridge that extends around the second microstrip such that the first and second microstrips do not intersect.

4. The antenna-coupler according to claim 3, wherein the bridge includes at least a jumper wire.

5. The antenna-coupler according to claim 3, further comprising an input port for connecting both the first microstrip and the second microstrip to the transceiver.

6. The antenna-coupler according to claim 1, further comprising:
    a first input port for connecting the first microstrip to the transceiver; and
    a second input port for connecting the second microstrip to the transceiver.

7. The antenna-coupler according to claim 1, wherein each of the first and second microstrips define a characteristic impedance and wherein the first resistive load is greater than the characteristic impedance of the first microstrip and the second resistive load is greater than the characteristic impedance of the second microstrip.

8. The antenna-coupler according to claim 7, wherein each of the first and second lengths is substantially equal to a multiple of one half a wavelength of an operational frequency of the antenna-coupler.

9. The antenna-coupler according to claim 8, wherein each of the first and second microstrips has a tapered profile.

* * * * *